(12) United States Patent
Liu et al.

(10) Patent No.: US 7,643,597 B2
(45) Date of Patent: Jan. 5, 2010

(54) METHODS FOR SELECTING A SUBSEQUENCE OF VIDEO FRAMES FROM A SEQUENCE OF VIDEO FRAMES

(75) Inventors: Tiecheng Liu, Columbia, SC (US); John R. Kender, Leonia, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 966 days.

(21) Appl. No.: 10/964,264

(22) Filed: Oct. 13, 2004

(65) Prior Publication Data
US 2005/0198575 A1 Sep. 8, 2005

Related U.S. Application Data

(63) Continuation of application No. PCT/US03/11714, filed on Apr. 15, 2003.

(60) Provisional application No. 60/372,778, filed on Apr. 15, 2002, provisional application No. 60/386,313, filed on Jun. 6, 2002.

(51) Int. Cl.
*H04L 7/02* (2006.01)
*G06T 13/00* (2006.01)
(52) U.S. Cl. ...................................... 375/360; 345/475
(58) Field of Classification Search ................ 348/170, 348/231.99, 404.1, 405.1, 419.1, 424.1, 390; 348/416, 420, 408; 382/225, 224, 239, 251, 382/253; 375/240.16, 240.24, 240.03, 240.01, 375/240.05, 240.13, 240.25, 360; 345/475, 345/619, 620, 625, 716, 723, 730
See application file for complete search history.

(56) References Cited

U.S. PATENT DOCUMENTS

| | | | | |
|---|---|---|---|---|
| 6,130,912 A | * | 10/2000 | Chang et al. | 375/240.16 |
| 6,573,907 B1 | | 6/2003 | Madrane | 345/719 |
| 6,763,068 B2 | * | 7/2004 | Oktem | 375/240.03 |
| 6,771,268 B1 | * | 8/2004 | Crinon | 345/475 |
| 2002/0028021 A1 | | 3/2002 | Foote et al. | |

OTHER PUBLICATIONS

M. K. Mandal, F. Idris, and S.Panchanathan, "A Critical Evaluation of Image and Video Indexing Techniques in Compressed Domain," Image and Vision Computing, pp. 513-529, 1999.

Andreas Girgensohn and John Boreczky, "Time-ConstrainedKeyframe Selection Technique," IEEE International Conference on Multimedia Computing and Systems, pp. 756-761, 1999.

(Continued)

*Primary Examiner*—Behrooz Senfi
(74) *Attorney, Agent, or Firm*—Baker Botts LLP

(57) ABSTRACT

A method for selecting a subsequence of video frames (72-84) from a sequence of video frames (70) comprising defining a distance function between video frames (72-84) in the sequence of video frames (70). An optimization criterion is defined to express a feature of a plurality of subsequences of video frames (72-84) selected from the sequence of video frames (70). A method is disclosed for displaying key frames for browsing and streaming.

31 Claims, 14 Drawing Sheets

OTHER PUBLICATIONS

Jia-Ling Koh, Chin-Sung Lee, and Arbee L. P. Chen, "Semantic Video Model for Content-based Retrieval," IEEE International Conference on Multimedia Computing and Systems, pp. 472-478, 1999.

Edoardo Ardizzone and Mohand-Said Hacid, "A Semantic Modeling Approach for Video Retrieval by Content," IEEE International Conference on Multimedia Computing and Systems, pp. 158-162, 1999.

H. S. Chang, S. Sull, and Sang Uk Lee, "Efficient Video Indexing Scheme for Content-based Retrieval," IEEE Trans. on Circuits and Systems for Video Technology, pp. 1269-1279, Dec. 1999.

Yueting Zhuang, Yong Rui, Thomas S. Huang, and Sharad Mehrotra, "Adaptive Key Frame Extraction Using Unsupervised Clustering," IEEE International Conference on Image Processing, pp. 866-870, 1998.

F. Idris and S. Panchanathan, "Review of Image and Video Indexing Techniques," Journal of Visual Communication and Image Representation, pp. 146-166, Jun. 1997.

M. Yeung and B. L. Yeo, "Time-Constrained Clustering for Segmentation of Video into Story Units," International Conference on Pattern Recognition, pp. 375-380, 1996.

Tat-Seng Chua and Li-Quan Ruan, "A Video Retrieval and Sequencing System," ACM Transactions on Multimedia Systems, pp. 373-407, 1995.

M. Yeung and B. Liu, "Efficient Matching and Clustering of Video Shots," Proceedings of the International Conference on Image Processing, pp. 338-341, 1995.

* cited by examiner

METHODS FOR SELECTING A SUBSEQUENCE OF VIDEO FRAMES FROM A SEQUENCE OF VIDEO FRAMES

CROSS REFERENCE TO RELATED APPLICATION(S)

The present application is a continuation of International Patent Application No. PCT/US03/11714, filed Apr. 15, 2003, published on Oct. 30, 2003 as International Patent Publication No. WO 03/090444, which claims priority to U.S. Provisional Application Ser. No. 60/372,778, filed on Apr. 15, 2002, entitled "Method for Selecting Key Frame Sequences from an Original Video Sequence", and U.S. Provisional Patent Application Ser. No. 60/386,313, filed on Jun. 6, 2002, entitled "Methods for Efficient Error-Minimizing, Variable-Rate, Temporal Video Sampling", the contents of which hereby incorporated by reference in their entireties herein.

CLAIM FOR PRIORITY TO RELATED APPLICATIONS

This application claims the benefit of U.S. Provisional Patent Application Ser. No. 60/372,778, filed on Apr. 15, 2002, entitled "Method for Selecting Key Frame Sequences from an Original Video Sequence," and U.S. Provisional Patent Application Ser. No. 60/386,313, filed on Jun. 6, 2002, entitled "Methods for Efficient Error-Minimizing, Variable-Rate, Temporal Video Sampling," which are hereby incorporated by reference in its entirety herein.

STATEMENT OF GOVERNMENT RIGHT

The present invention was made in part with support of the National Science Foundation, award no. EIA-00-71954. Accordingly, the United States Government may have certain rights to this invention.

COMPUTER PROGRAM LISTING

A computer program listing is submitted in the Appendix, and are incorporated by reference in their entirety herein.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

This invention relates to systems and methods for selecting subsequences of video sequences, such as key frames, and more particularly to methods for selecting the subsequence of video frames to optimize a particular criterion of the video.

2. Background

Key frames are typically defined to be an unordered subset of video frames that represent the visual content of a video. Key frames are of useful in video indexing, summarization, content retrieval, and browsing. There are at least three main approaches to video key frame selection. In the first, video key frame selection is based on video segmentation, and is often used for highly edited commercial videos (see, e.g., Tat-Seng Chua and Li-Quan Ruan, "A Video Retrieval and Sequencing System," *ACM Transactions on Multimedia Systems*," pp. 373-407, 1995). A drawback of this first approach is that the results depend on the accuracy of video segmentation (as discussed in greater detail in, e.g., J. Boreczky and L. Rowe, "Comparison of Video Shot Boundary Detection Techniques," *Storage and Retrieval for Still Image and Video Databases*, pages 170-179, 1996). Therefore, it is not an optimal technique for semi-edited (e.g., instructional) videos, unedited (e.g., home) videos, or extended single-shot (e.g., surveillance) videos.

The second approach uses clustering techniques based on a definition of "far enough" frames (see, e.g., Andreas Girgensohn and John Boreczky, "Time-Constrained Keyframe Selection Technique," *IEEE International Conference on Multimedia Computing and Systems*, pages 756-761, 1999; M. Yeung and B. Liu, "Efficient Matching and Clustering of Video Shots," *Proceedings of the International Conference on Image Processing*, pages 338-341, 1995; M. Yeung and B. L. Yeo, "Time-Constrained Clustering for Segmentation of Video into Story Units," *International Conference on Pattern Recognition*, pages 375-380, 1996; and Yueting Zhuang, Yong Rui, Thomas S. Huang, and Sharad Mehrotra, "Adaptive Key Frame Extraction Using Unsupervised Clustering," *IEEE International Conference on Image Processing*, pages 866-870, 1998). But an inherent drawback in this second approach is the choosing of appropriate thresholds. Although adaptive clustering methods may manipulate the threshold to produce a pre-designed number of key frames, this iterative searching process may make these methods computationally expensive.

The third approach converts a key frame selection problem to a problem of searching for the minimum cover of a set of key frames, based on the definition of a semi-Hausdorff distance function (see, e.g., H. S. Chang, S. Sull, and Sang Uk Lee, "Efficient Video Indexing Scheme for Content-based Retrieval," *IEEE Trans. on Circuits and Systems for Video Technology*, pages 1269-1279, December 1999). But this search can be shown to be NP-hard, i.e., an algorithm for solving it can be translated into one for solving any other nondeterministic polynomial time problem, and the $O(n^2)$ greedy algorithm approximation to it is computationally expensive. Additionally, in both this and the previous approaches, the frames are chosen without regard to their temporal order, although such temporal relations may be very important in video summarization, streaming and compression.

Another aspect of prior research on key frames concerns the level of frame sampling. Sparse sampling, which is the selection of about one frame per shot or per scene, is usually used in video content summarization and indexing. Dense sampling, which chooses much more than one frame per shot or per scene, is more useful for video streaming, particularly in network environments where frame-dropping decisions are made in real time according to dynamic changes of network bandwidths or user requirements. Most of prior research in this area appears to concentrate on sparse video frame sampling (see, e.g., Edoardo Ardizzone and Mohand-Said Hacid, "A Semantic Modeling Approach for Video Retrieval by Content," *IEEE International Conference on Multimedia Computing and Systems*, pages 158-162, 1999; Madirakshi Das and Shih-Ping Liou, "A New Hybrid Approach to Video Organization for Content-Based Indexing," *IEEE International Conference on Multimedia Computing and Systems*, 1998; F. Idris and S. Panchanathan, "Review of Image and Video Indexing Techniques," *Journal of Visual Communication and Image Representation*, pages 146-166, June 1997;

Jia-Ling Koh, Chin-Sung Lee, and Arbee L. P. Chen, "Semantic Video Model for Content-based Retrieval, *IEEE International Conference on Multimedia Computing and Systems*, pages 472-478, 1999; and M. K. Mandal, F. Idris, and S. Panchanathan, "A Critical Evaluation of Image and Video Indexing Techniques in Compressed Domain," *Image and Vision Computing*, pages 513-529, 1999). Although some other work, for example, the minimum-cover method (see, e.g., H. S. Chang, S. Sull, and Sang Uk Lee. Efficient Video Indexing Scheme for Content-based Retrieval. In *IEEE Trans. on Circuits and Systems for Video Technology*, pages 1269-1279, December 1999), can be applied to dense sampling, generally their complexity make them unsuitable in use for extended or real-time videos.

Accordingly, there is a need in the art for a method for selecting a subsequence of video frames from a sequence of video frames which overcomes the drawbacks of the prior art as discussed above.

SUMMARY OF THE INVENTION

It is an object of the invention to provide a unified approach for both levels of key frame selection, with application for both video summarization and streaming.

It is another object of the invention to provide results of key frame selection that may be easily applied to video indexing and interactive content retrieval applications.

It is a further object of the invention to provide a method having an efficient computation complexity in terms of the number of video frames.

These and other objects of the invention, which will become apparent with reference to the disclosure herein, are accomplished by a method for selecting a subsequence of video frames from a sequence of video frames which comprises defining a distance function between video frames in the sequence of video frames. An optimization criterion is defined to express a feature of a plurality of subsequences of video frames selected from the sequence of video frames. For a predetermined number of iterations the following steps are performed: A first subsequence of video frames and a second subsequence of video frames are defined, in which the video frames in the first subsequence and second subsequence are selected from the sequence of video frames. For each video frame in the second subsequence of video frames, a respective optimal value of the optimization criterion is determined between that video frame and each prior video frame in the first subsequence. Information relating to the video frames associated with the optimal value is stored. The first subsequence and the second subsequence are incremented.

An overall optimal value is determined among the optimal values of the optimization criterion determined above. The video frames which were stored and associated with the overall optimal values of the optimization criterion are retrieved.

According to an exemplary embodiment, the step of defining the distance function may comprise defining the histogram difference based on the $L^1$ norm. The step of defining the optimization criterion may comprise defining the sum of all distances of adjacent frames in a subsequence. The optimal value of the optimization criterion is a maximum value of the optimization criterion.

The step of determining a respective optimal value of the optimization criterion as determined between the video frame and each prior video frame in said first subsequence may include determining a maximum value of a sum of a difference between said video frame and a prior video frame in the first subsequence and an optimal value of the optimization criterion for a previous iteration. The predetermined number of iterations may be a selected number of key frames.

In another exemplary embodiment, the video frames selected above are each associated with a display time in which display of each video frame begins. The method may further include the step of determining the display time such that an error function is minimized. The error function may be a distance function measured between said video frames.

According to another exemplary embodiment, a method for selecting a first subsequence of video frames selected from a sequence of video frames comprises the steps of defining a distance function between video frames in the sequence of video frames and defining an optimization criterion to express a feature of subsequences of video frames selected from said sequence of video frames. Values of the optimization criterion for each frame in the sequence of video frames are determined and the video frames are organized according to the values of the optimization criterion. A frame associated with an optimal value of the optimization criterion is discarded, and the video frames remaining after the discarding are reorganized. Values of the optimization criterion are determined for video frames affected by the step of discarding, and the video frames are reorganized. For a predetermined number of iterations, the step of discarding frames associated with an optimal value of the optimization function and the step of determining the values of the optimization criterion for those video frames affected by the step of discarding are repeated.

The method may further comprise the step of creating a reconstructed sequence of video frames based on a subsequence of video frames, and wherein the optimization criterion corresponds to the difference between corresponding frames of the sequence of video frames and the reconstructed sequence of video frames. The step of defining the optimization criterion function may comprise defining the root mean square error of all distances of corresponding frames from said sequence of video frames and said sequence of reconstructed video frames.

According to another embodiment, the step of defining an optimization criterion for each frame in the sequence of video frames may further comprise defining a compensation value which represents a differential change of the value of the optimization criterion if the frame is discarded.

The step of organizing said video frames according to the values of the optimization criterion may comprise organizing the video frames in a binary tree structure. Nodes of the binary tree structure may correspond to the video frames. The binary tree structure may be a binary heap. A node corresponding to a video frame having the lowest value of the optimization criterion may be located at the root node of the binary tree structure. The step of discarding a frame associated with an optimal value of the optimization criterion may comprise discarding the video frame having the lowest value of the optimization criterion. The step of reorganizing the video frames remaining after said discarding may comprise reorganizing said remaining video frames into a binary heap. The optimization criterion may be recalculated for video frames adjacent the discarded frame, and the video frames may be reorganized in a binary heap.

According to an embodiment of the invention, the method may comprise storing information associated with the discarded frame. The video frames remaining after the step of discarding may be displayed. The method may provide the option of displaying video frames discarded in said step of discarding which are located between a pair of selected frames.

In accordance with the invention, the objects as described above have been met, and the need in the art for technique for accurately and efficiently selecting a subsequence of video frames from a sequence of video frames, has been satisfied.

BRIEF DESCRIPTION OF THE DRAWINGS

Further objects, features and advantages of the invention will become apparent from the following detailed description taken in conjunction with the accompanying figures showing illustrative embodiments of the invention, in which.

Figure 1:
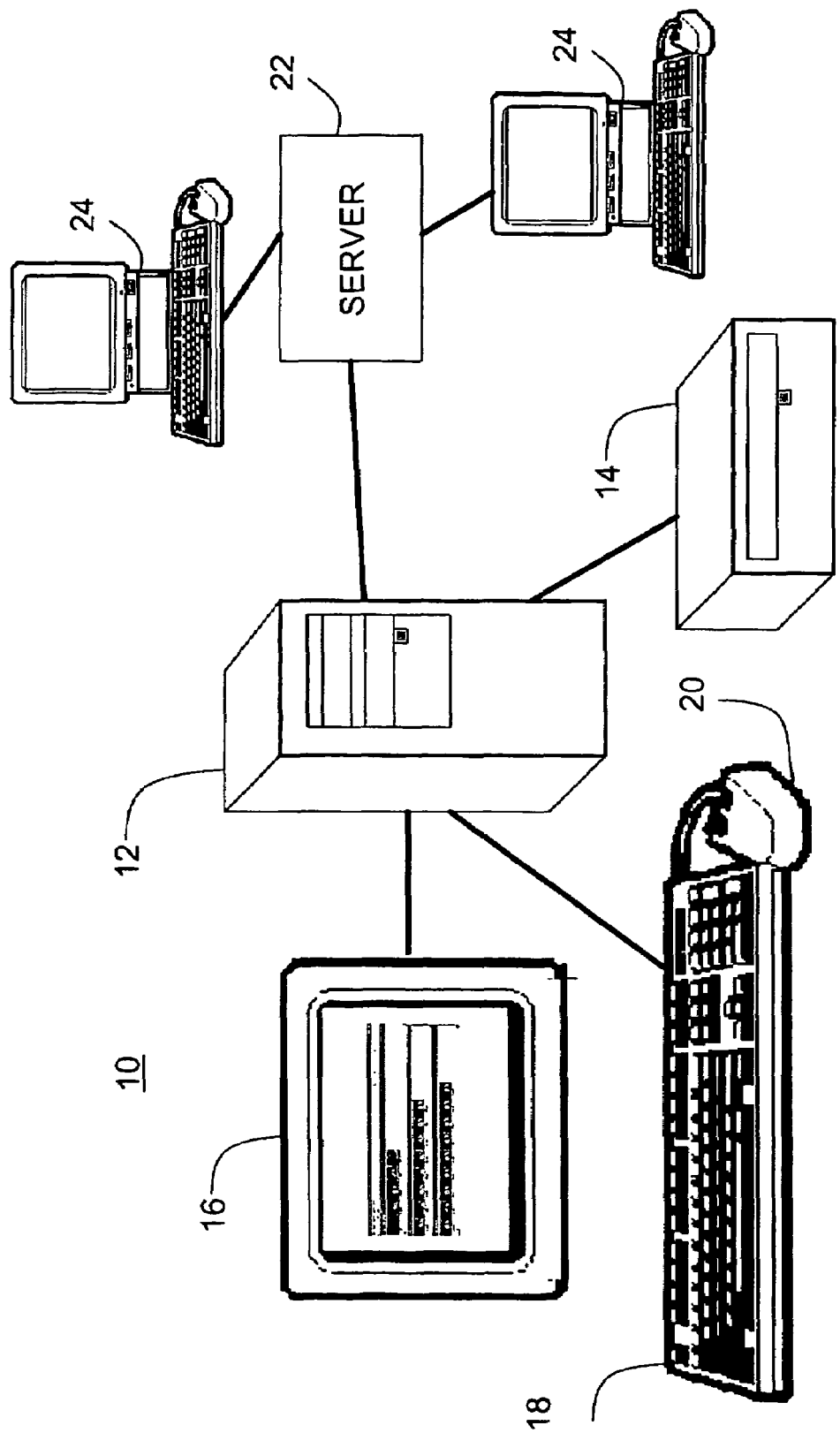
FIG. 1 illustrates a schematic view of the system in accordance with the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE EXEMPLARY EMBODIMENTS

An exemplary system 10 for implementing the methods described herein is illustrated in FIG. 1. The computations may be performed on a CPU 12, such as an Intel™ Pentium III™ 500 MHz processor. The sequence of video frames are stored on a storage device, such as a hard drive 14 having a capacity of about 10 GB. The video frames are typically digitized into MPEG1 format, and stored in the storage unit. Alternative formats for storing the video frames include MPEG2, MPEG4, and AVI formats. The user interface, as will be described in greater detail herein, which may include display, e.g., monitor 16, and user input devices, such as keyboard 18 and/or mouse 20 or other pointers. The software, which will be described below, is in the programming language C++. The system 10 as described herein may also be connected to a network, which may include a server 22 and additional clients 24. The system 10 operating on CPU 12 may either act as a client and receive data from server 22 or it may transmit data to server 22 or clients 24.

The methods described herein provide an optimization approach for selection of video key frames. An optimization criterion, e.g., and energy function, is defined on the selected key frames. Considering key frames as a temporally ordered subsequence of the original video sequence, the key frame selection problem is treated by the novel method described herein as a global optimization problem, solvable by dynamic programming. In a preferred embodiment, the sum of all distances of temporally adjacent key frames is used as the optimization criterion. If a video is considered as a weighted directed acylic graph in which every frame is represented by a node, the weight of an edge is the measured visual distance between two frames, and the direction is strictly limited to the temporal order of frames, then to select k optimal key frames is to find the longest path with k nodes in the graph.

Based on the criterion defined above, a first embodiment of the invention provides an optimal solution for key frame selection to compute the entire key frame hierarchy, for all $k, 1 \leq k < n$, based on dynamic programming with $O(n^3)$ computation time. To further reduce computation complexity, additional exemplary embodiments utilize a greedy algorithm based on an optimization process which operates in a level-to-level manner, decreasing k, and which operates with almost linear computation complexity.

The methods of key frame selection treat this process as an optimization problem. First, some terms for video key frame selection is described herein. For a n frame video $f_1, f_2, \ldots, f_n$, let F be the sequence of all frames $F = \{f_1, f_2, \ldots, f_n\}$. There is a distance $\|\cdot\|$ defined on F. This distance can be any user-defined metric. In accordance with the exemplary embodiment, the color histogram difference based on the $L^1$ norm is used.

The following terminology is used: $F_i^k = \{f_{i_1}, f_{i_2}, \ldots, f_{i_k}\}$ is a selection of F comprising k key frames if $F_k^i \subset F$ and $1 \leq i_1 < i_2 < \ldots < i_k \leq n$, where i represents a selection method, $F_k^i \neq F_k^j$ if i≠j. (For example, one such selection method is to make $i_k = 2k$, i.e., the subsequence contains only the frames with even frame numbers.) In other words, $F_k^i$ is a k key frame selection of F if $F_k^i$ is a strict temporal subsequence of F with k elements.

An optimization criterion, e.g., an energy function, is used $f(\alpha, \beta)$, in which α is a subsequence (i.e., key frame selection) of the longer sequence β. By the terminology described above, $F_k^p$ is a k key frame selection of F using selection method p. $F_k^p$ is considered an "optimal k key frame selection" of F if it maximizes the optimization criterion for all k key frame selections:

$$f(F_k^p, F) = \max_i \{f(F_k^i, F)\} \quad [1]$$

Let $S^*_k = \max_i \{f(F_k^i, F)\}$ be the "optimal value" of the energy function of all k key frame selections. Accordingly, $F_k^p$ is considered an optimal key frame sequence of length k if and only if $f(F^p_k, F) = S^*_k$.

Using the definitions above, the video key frame selection problem is expressed as a subsequence in the novel method as an optimization problem. Further, according to the exemplary embodiment, the optimization criterion (energy function) is defined as:

$$f(F_k^i, F) = \sum_{p=1}^{k-1} \|f_{l_p} - f_{l_{p+1}}\| \qquad [2]$$

This definition explicitly acknowledges the significant perceptual impact that occurs between temporally adjacent key frames, and thus promotes the selection of those key frames which are maximally distant from their immediate temporal predecessors. Accordingly, to maximize this criterion is to reduce redundancy in selected key frames and to maximize content coverage.

The first exemplary embodiment incorporates an optimal solution which is based on dynamic programming. The optimal algorithm used in the embodiment is described herein. In developing a process of searching for the optimal k key frames, one straightforward theoretical approach is to investigate all possible k subsequences of the original video. The number of all such subsequences is expressed by the binomial coefficient $C_n^k$, which is not polynomial in terms of n. However, the method is accordance with the invention reduces the computation complexity to polynomial time by using a dynamic programming approach. The k key frame selection problem can be converted to a k-step decision problem solvable by dynamic programming, by exploiting an "optimal substructure" existing within the key frame selection. (Further details regarding the optimal substructure are described in T. H. Cormen, C. E. Leiserson, R. L. Rivest, and C. Stein, *Introduction to Algorithms*, The MIT Press, Chapter 15, 2001, which is incorporated by reference in its entirety herein.)

It is possible to utilize this approach based on the assumption that an optimal substructure exists, which is proven to exist by using a proof by contradiction. Let $F_{k,p}^i = \{f_{i_1}, f_{i_2}, \ldots, f_{i_{k-1}}, f_p\}$ represent k key frames selected using selection index i under the condition of the last key frame being $f_p$. It is obvious that $p \geq k$ for any $F_{k,p}^i$. Accordingly, $F_{k,p}^i$ is called a "conditional k key frame selection," and $S_{k,p}^{i,p} = f(F_{k,p}^i, F)$. Let $S_{k,p}^*$ be the optimal energy value of k frames with that last key frame $f_p$, $$S_{k,p}^* = \max_i \{f(F_{k,p}^i, F)\} \qquad [3]$$

$F_{k,p}^i$ is an optimal k key frame selection with the last key frame $f_p$ when $f(F_{k,p}^*, F) = S_{k,p}^*$.

Now assume that $F_{k+1,p}^j$ is an optimal k+1 key frame selection with last key frame $f_p$. Then $F_{k,j_k}^j$ must also be an optimal k key frame selection with last frame $f_{j_k}$, since otherwise there must exist another $F_{k,j_k}^t$ with $S_{k,j_k}^t > S_{k,j_k}^j$. Let $F_{k+1,p}^t = \{f_{t_1}, f_{t_2}, \ldots, f_{t_{k-1}}, f_{j_k}, f_p\}$. $F_{k+1,p}^t$ has energy value $$S_{k+1,p}^t = \|f_p - f_{j_k}\| + S_{k,j_k}^t > \|f_p - f_{j_k}\| + S_{k,p}^j = S_{k+1,p}^j \qquad [4]$$

But this contradicts the assumption that $F_{k+1,p}^j$ is an optimal k+1 key frame selection with last key frame $f_p$. So the optimal key frame selection problem has an optimal substructure: any subsequence of the optimal key frame selection must also be an optimal key frame selection. Thus we have $$S_{k+1,p}^* = \max_{k \leq m < p} \{\|f_p - f_m\| + S_{k,m}^*\}. \qquad [5]$$

From the equation above, a dynamic programming technique for optimal key frame selection is described herein. A distance function is defined as between video frames. An optimization criterion, e.g., energy function, is defined. According to our definition of the energy function, $S_{l,m}^i = 0$ for any m and i, i.e., where $S_{l,m}^i$ is a value of the energy function for a k=1 key frame sequence, i.e., one key frame.

Figure 2:
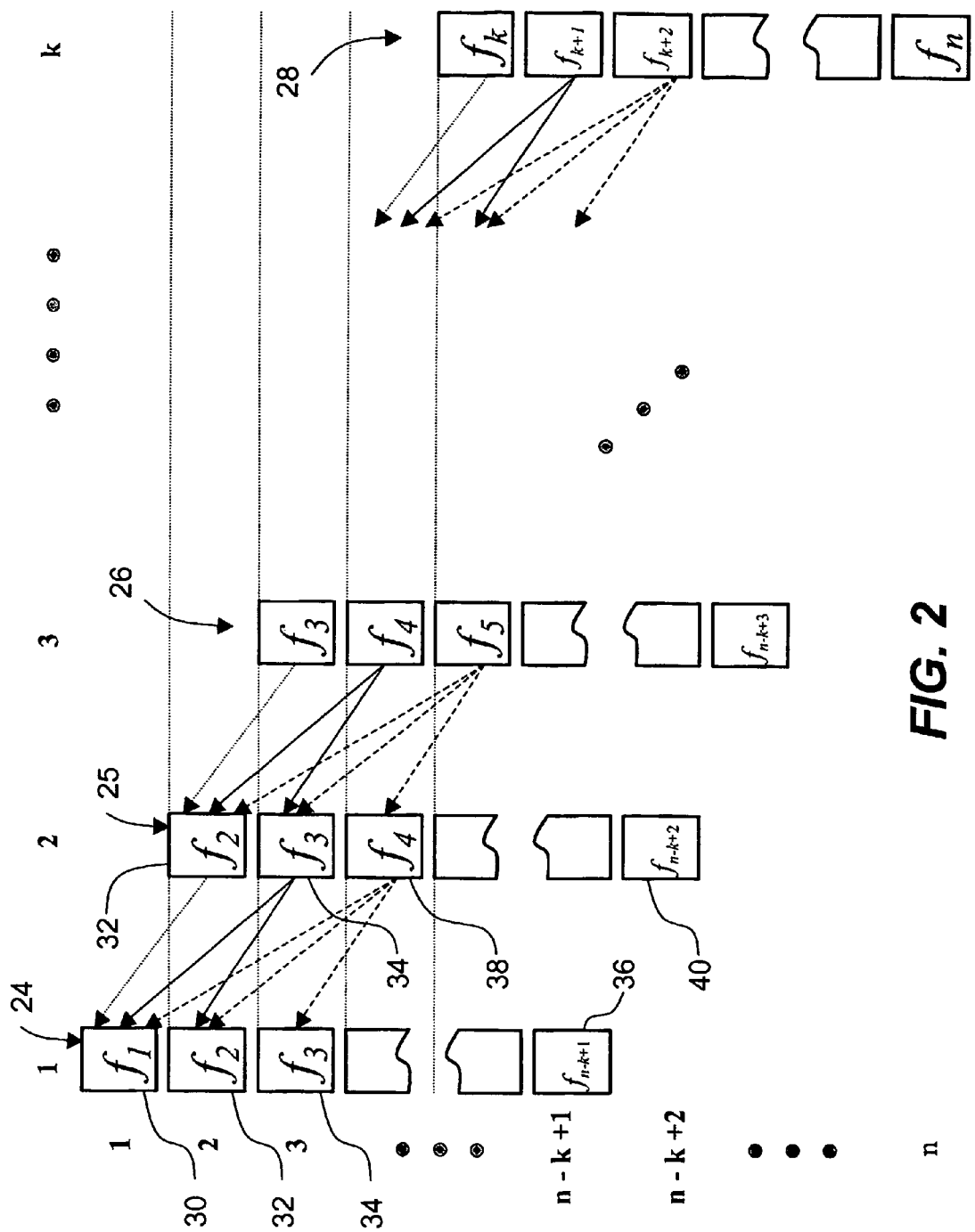
FIG. 2 illustrates a first embodiment of the method for selecting subsequence of video frames in accordance with the present invention.

To select k optimal key frames from the original video sequence, as shown in FIG. 2, a plurality of subsequences are selected in a sequential order to calculate the optimization criterion between video frames. As can be seen in FIG. 2, in order to select k optimal key frames from an original video sequence having n frames, the length of each subsequence is set to n−k+1. Accordingly, the key frames in the first subsequence 24 may be selected from the subsequence $\{f_1, f_2, \ldots, f_{n-k+1}\}$, and $S_{l,m}^* = 0$ for $1 \leq m \leq n-k+1$, in which key frames $f_1$ 30, $f_2$ 32, $f_3$ 34, ... $f_{n-k+1}$ 36 are illustrated in FIG. 2. The second key frame can be selected from the subsequence 25 $\{f_2, f_3, \ldots, f_{n-k+2}\}$, in which key frames $f_2$ 32, $f_3$ 34, $f_4$ 38, ... $f_{n-k+2}$ 40 are illustrated. The second subsequence 25 is selected such that the first frame $f_2$ 32 in the second subsequence 25 is advanced from the first frame $f_1$ 30 in subsequence 24 by one frame. The optimal values are updated for the second step (or "level") in FIG. 2:

$$S_{2,p}^* = \max_{1 \leq m < p} \{\|f_p - f_m\| + S_{1,m}^*\} \qquad [6]$$

where $2 \leq p \leq n-k+2$. For each frame $f_p$ in subsequence 25, the optimal value of the optimization criterion is determined between the particular frame $f_p$ and each prior video frame $f_m$ in the first (previous) subsequence. Purpose of the description herein, a "prior" video frame refers to a frame which would be played prior to video frame of interest. As illustrated in FIG. 2, the distance is determined between the first frame $f_2$ 32 in subsequence 25 and all of the prior frames in the previous subsequence, i.e., the first frame $f_1$ 30 in subsequence 24. This distance value is added to the optimal value for the first (previous) subsequence $S_{1,m}^*$. The optimal value for frame $f_2$ 32 is the maximum value of this sum, which is trivial since there is only one prior frame in the previous subsequence. Similarly, the distance is determined between the second frame $f_3$ 34 in subsequence 25 and all of the previous frames in the prior subsequence, i.e., the first frame $f_1$ 30 and the second frame $f_2$ 32 in subsequence 24. This distance values are each added to the optimal value for the first (previous) subsequence $S_{1,m}^*$. The optimal value for frame $f_3$ 34 is the maximum value of these two sums.

Using this technique, there are a plurality of optimal values $S_{2,p}^*$, i.e., one optimal value for each video frame $f_p$, where $2 \leq p \leq n-k+2$, in which each video frame $f_p$ is compared with all video frames $f_m$, where $1 \leq m < p$. Pointers are stored relating to the values of p and m. Accordingly, a subsequence of video frames is stored in which the video frame being compared to all prior video frames in the previous subsequence is stored as the last video frame in this sequence.

The algorithm may be further generalized. After every step, the optimal values of the conditional key frame selections are calculated as follows. Assume the qth level has already been calculated from the subsequence $\{f_q, f_{q+1}, \ldots, f_{n-k+q}\}$, referred to as the "previous" subsequence herein, in which the optimal values are derived, e.g., $S_{q,m}^*$ for $q \leq m \leq n-k+q$. (For the above discussion relating to equation [6], q=0 for the first key frame and q=1 for the second key frame.) For the next step, the $q+1^{th}$ key frame can be chosen from the subsequence $\{f_{q+1}, f_{q+2}, \ldots, f_{n-k+q+1}\}$, referred to herein as the "current" subsequence. We compute all conditional values for level q+1:

$$S_{q+1,p}^* = \max_{q \leq m < p} \{\|f_p - f_m\| + S_{q,m}^*\} \quad [7]$$

where $q+1 \leq p \leq n-k+q+1$. This process is repeated k times, until the optimal values for the k-th step $S_{k,p}^*, k \leq p \leq n$ are calculated. (With each successive iteration, the frames designated the current subsequence in one iteration are designated the previous subsequence in the next iteration, as can be seen in FIG. 2.) Then the optimal value of energy function is $$S_k^* = \max_{k \leq p < n} S_{k,p}^* \quad [8]$$

Suppose the last key frame is the frame $f_t, S_{k,t}^* = S_k^*$. Starting from the last key frame, back-pointers are followed to the pre-stored prior optimal subsequences, and the optimal k key frames can be retrieved.

Figure 3:
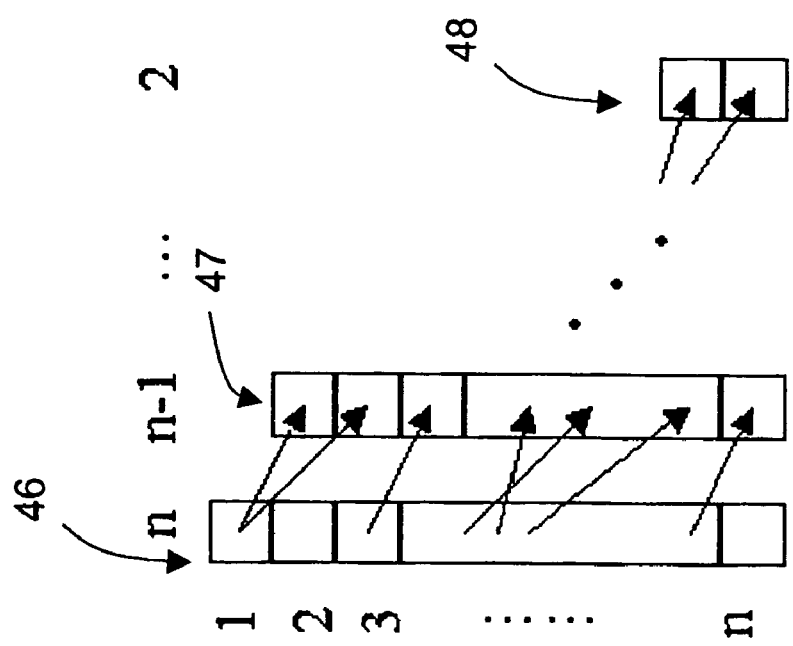
FIG. 3 illustrates a method for determining a hierarchy of video frames in accordance with the present invention.

As shown in the dynamic programming process above, to compute k optimal key frames, an array of size of k(n−k+1) is needed to store the optimal paths of subsequences for final retrieval, and another n−k+1 sized array is used to store the optimal values. Therefore, memory usage is O(k(n−k)). As for time, the frame distance computation is 1+2+...+(n−k+1) for every step except the first step, and there are totally k−1 steps to compute, so the total computation is $O(k(n-k)^2)$. The entire key frame hierarchy of all such k can be computed in $O(n^3)$ time and $O(n^2)$ space using a similar process as shown in FIG. 3(b), in which the subsequences of video frames are ordered from the original sequence of n frames 46, followed by the a subsequence 47 of k−1 frames, down to the subsequence 48 of k=2 frames.

One exemplary use of the key frames that are selected using the above technique is for a compressed version of the original video. When playing the compressed video, the appropriate time to advance between key frames should be properly calculated to ensure good quality of video playback. For example, suppose the two key frames $\{f_1, f_4\}$ are selected from a video $f_1$-$f_2$-$f_3$-$f_4$-$f_5$. When playing the compressed version of the video, there is a problem of when to display video frame $f_4$. The straightforward solution of displaying a key frame at its corresponding temporal position in the original video often incurs "content lag": if frame $f_3$ is closer in content to frame $f_4$, rather than playing $f_1$-$f_1$-$f_1$-$f_4$-$f_4$, the video sequence of $f_1$-$f_1$-$f_4$-$f_4$-$f_4$ would be more reasonable.

To address "content lag," a criterion of minimum sampling error is used to determine the most appropriate times to advance between key frames. Each key frame is associated with a display time which indicates the time to start displaying the respective key frame. Suppose the original video is $\{f_1, f_2, \ldots, f_n\}$ and the selected k key frames are $F_k^i = \{f_{i_1}, f_{i_2}, \ldots, f_{i_k}\}$. The time to start displaying key frame $f_{i_p}$ should be between $i_{p-1}$ and $i_p$. The start time m is selected such that m minimizes sampling error:

$$err(i_{p-1}, m, i_p) = \min_{i_{p-1} \leq t < i_p} \{err(i_{p-1}, t, i_p)\} \quad [9]$$

Therefore, $err(i_{p-1}, t, i_p)$ is defined as accumulated sampling error for displaying $f_{i_p}$ at t between $i_{p-1}$ and $i_p$:

$$err(i_{p-1}, t, i_p) = \sum_{j=i_{p-1}+1}^{t-1} \|f_{i_{p-1}} - f_j\| + \sum_{j=t}^{i_p-1} \|f_j - f_{i_p}\| \quad [10]$$

This computation can be done in linear time, as follows. A first step is to calculate $$err(i_{p-1}, i_{p-1}+1, i_p) = \sum_{m=i_{p-1}+1}^{i_p-1} \|f_m - f_{i_p}\| \quad [11]$$

Then $err(i_{p-1}, t, i_p)$ is obtained for all $i_{p-1} < t < i_p$ by an iterative process. After $err(i_{p-1}, t, i_p)$ is known, $err(i_{p-1}, t+1, i_p)$ can be derived as $$err(i_{p-1}, t+1, i_p) = err(i_{p-1}, t, i_p) + \|f_{i_{p-1}} - f_{i_{p-1}+1}\| - \|f_{i_p} - f_{i_{p-1}+t}\| \quad [12]$$

The computation of all $err(i_{p-1}, t, i_p)$, $(i_{p-1} < t < i_p)$, takes $O(i_p - i_{p-1})$ time. Thus the complexity for computing all appropriate starting times for key frame playback is O(n).

Another exemplary embodiment of the invention will now be explained. As before, the optimal k key frame selection is defined to be the k frames from F that optimize the optimization criterion, e.g., energy function $f(F_k^i, F)$. This embodiment includes a fast approximation to the dynamic programming approach of the previously described embodiment. In contrast to the previous embodiment, this approach proceeds in order of decreasing k.

Figure 4:
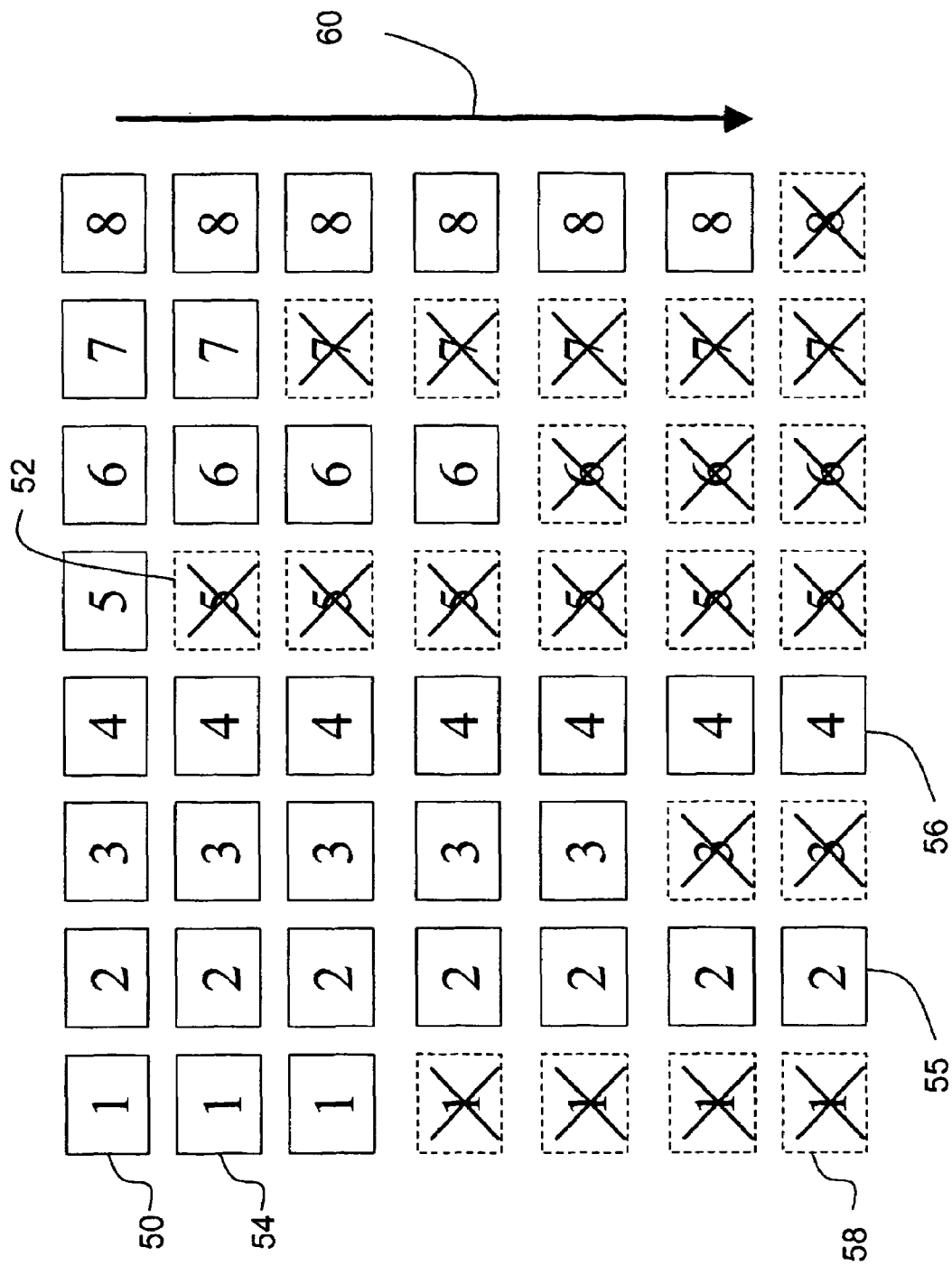
FIG. 4 illustrates another embodiment of the method for selecting subsequence of video frames in accordance with the present invention.

According to this technique, the original video F includes n frames. For example, as illustrated in FIG. 4, there are eight frames in the original video, i.e., the first level 50. This technique drops individual video frames, e.g., the fifth frame 52 at the second level 54, until the desired number of key frames remain, e.g., the second frame 55 and the fourth frame 56 at the seventh level 58. The flow of operation for frame compression is indicated by arrow 60. (Frame recovery, which proceeds in the opposite direction of frame compression is explained below.) For example, k key frames have been selected from a video sequence to produce subsequence $F_k'$. To select k−1 key frames, this technique does not directly choose those k−1 frames from original frame sequence F. Rather, the greedy algorithm selects k−1 key frames $F_{k-1}'$ from $F_k'$ to optimize the energy function. The process of selecting k−1 frames from $F_k'$ means choosing one frame in $F_k'$ to drop. Since there are k such choices, the following equation applies:

$$f(F_{k-1}', F_k') = \max_i f(F_{k-1}^i, F_k') = \max_{1 \leq p \leq k} f(F_k' | \{f_{i_p}\}, F_k') \quad [13]$$

Starting from the original n frames (the "nth level"), this level-to-level greedy algorithm retains for the next level those n−1 key frames that maximize $f(F_{n-1}^i, F)$. And in general, if it has determined a greedy k-level key frame selection $F_k'$, the greedy k-1-level key frame selection $F_{k-1}'$ is determined solely from $F_k'$. This process continues until it reaches a user-designated level of key frames. Along the way, a list of the frames is stored and ranked by frame "significance," and which records the order in which the frames were discarded from level to level. The key frames left in the final level are considered to be the most significant frames, e.g., the seventh level 58 in FIG. 4, and the frame dropped from the n to n−1 level, e.g., from the first level 50 to the second level 54 in FIG. 4, is considered as the least significant frame.

This greedy algorithm has several advantages. First, its computation complexity is $O(n \cdot \log(n))$, which is an improvement over the $O(n^3)$ complexity of the dynamic programming solution. Second, it provides a hierarchy of key frames with a shorter "edit distance" between levels, as the key frames in a further level is a strict subset of the key frames in any prior level, which makes it more appropriate for interactive content retrieval and searching. Third, the results of the greedy algorithm can easily accommodate the change of network bandwidths in streaming, as will be discussed below.

According to our definition of greedy key frames, the algorithm in accordance with the invention chooses k−1 greedy key frames from k already selected key frames, $$S'_{k-1} = \max_{1 \leq p \leq k} S^p_{k-1} = \max_{1 \leq p \leq k} f(F'_k | \{f_{i_p}\}, F'_k) \quad [14]$$

Using the same definition of the optimization criterion, e.g., the energy function, as for the previous embodiment, for greedy key frames, the following equation applies:

$$S_{k-1}^p = S_{k'} - V_{i_p}, \quad 1 \leq p \leq k \quad [15]$$

where $V_{i_p}$ is called the "compensation value" or "impact value," a measure of differential change of total sub-sequence energy:

$$V_{i_p} = \begin{cases} \|f_{i_1} - f_{i_2}\|, & p = 1 \\ \|f_{i_k} - f_{i_{k-1}}\|, & p = k \\ \|f_{i_{p-1}} - f_{i_p}\| + \|f_{i_p} - f_{i_{p+1}}\| - \|f_{i_{p+1}}\|, & 1 < p < k \end{cases} \quad [16]$$

Every frame $f_{i_p}$ corresponds to a compensation value $V_{i_p}$, which records the differential change of energy value if the frame is discarded. The value of $S_{k-1}^p$ is maximized by dropping the frame in the subsequence $\{f_{i_1}, f_{i_2}, \ldots, f_{i_k}\}$ which has the minimum compensation value or impact value. As a consequence, monotonicity of energy values is maintained in the greedy key frame hierarchy.

Figure 5:
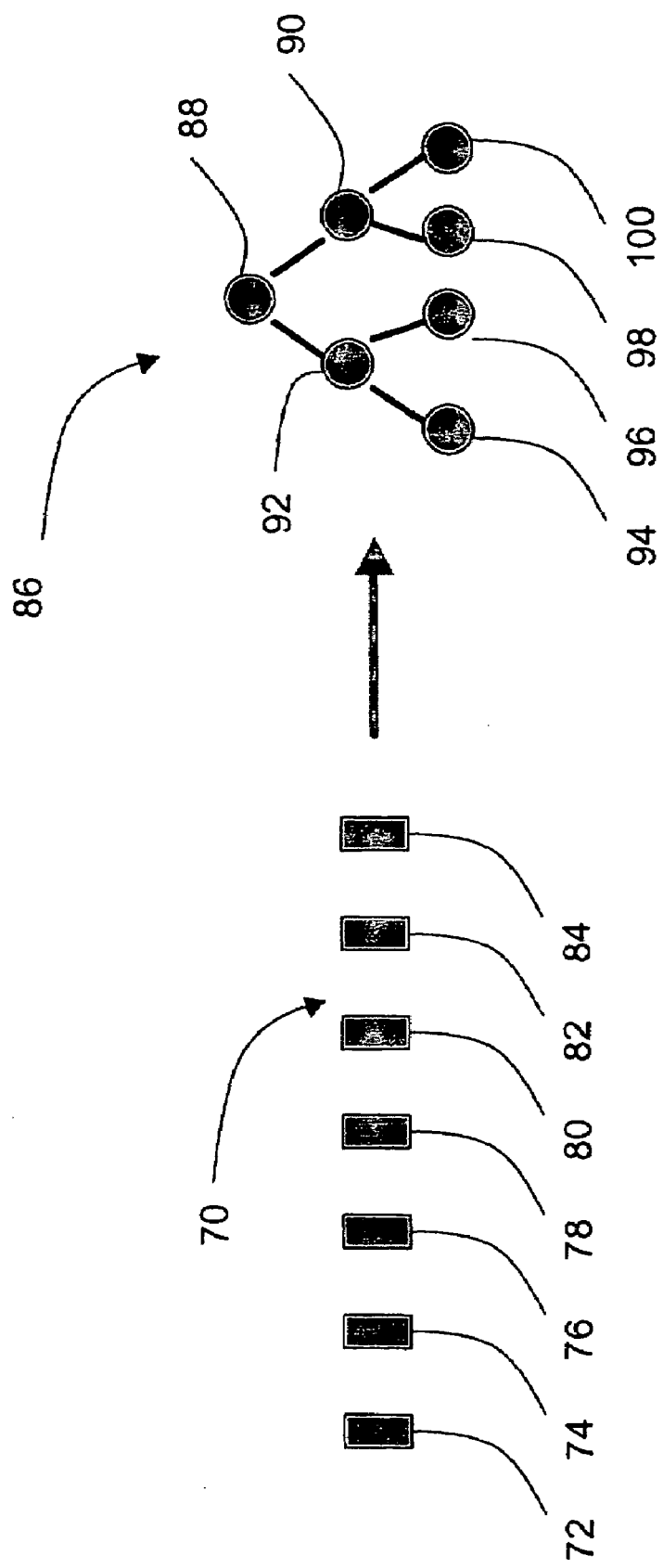
FIG. 5 illustrates a stage of representing video frames in a binary tree structure in accordance with the present invention.

In more detail, the bottom-up level-to-level optimization process starts from original n frames 72-84 of frame sequence 70 (FIG. 5). First, the compensation value is computed for every frame. Then, the frame sequence is arranged in a binary heap 86 including nodes 88-100. As is well-known in the art, a binary heap is binary tree structure having a plurality of nodes, in which every node has a key which is greater than (or equal to) the key of its parent. Heaps support the arbitrary seeking and deletion of the minimum value, which is located at the root node. Thus, binary heap structure 86 is configured such that the minimum key, or compensation value, is located at root node 88. Each of nodes 90 and 92 have greater compensation values than node 88.

Figure 6:
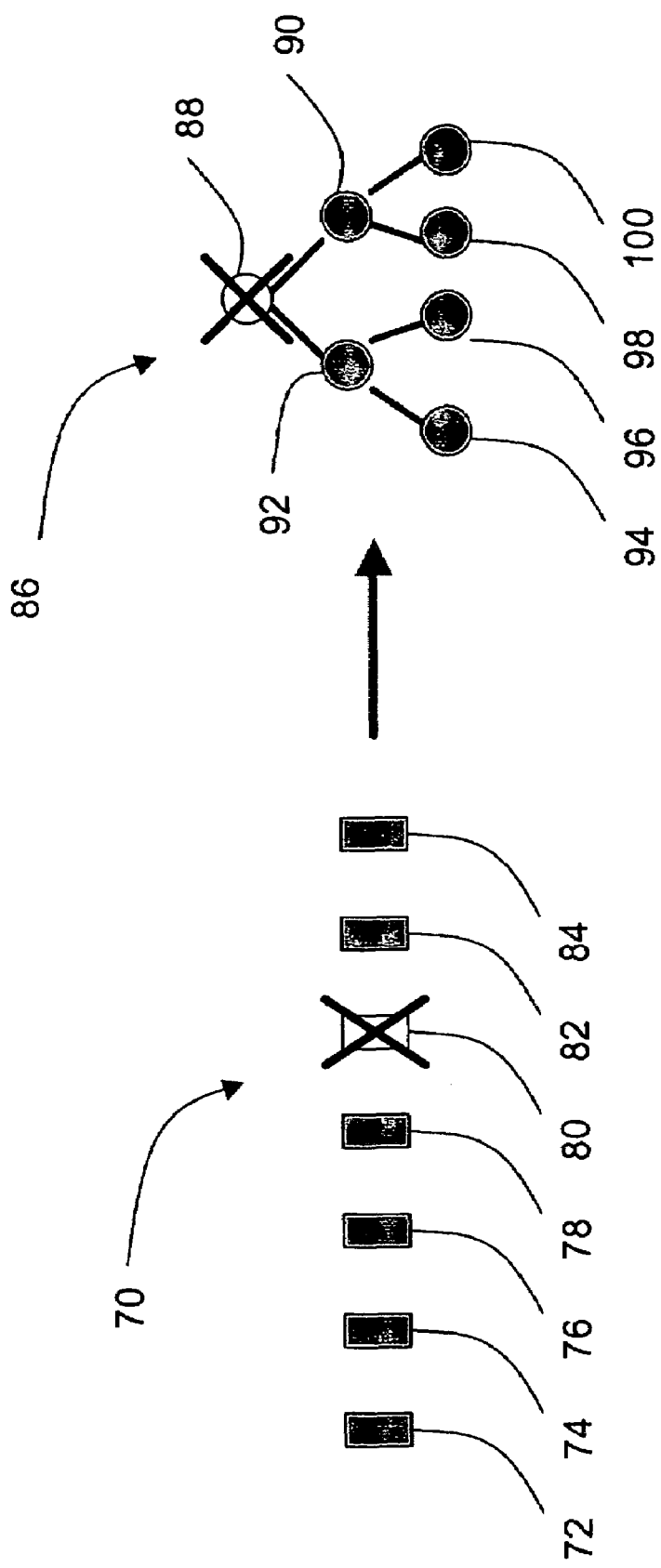
FIG. 6 illustrates a stage of deleting a video frame in accordance with the present invention.

A subsequent step is illustrated in FIG. 6, in which the frame with minimum compensation value is identified. If the binary heap is used, as in the exemplary embodiment, the minimum compensation value is found to be at the root node 88, which corresponds to frame 82. That frame is dropped, and the remaining sequence includes the n−1 greedy key frames. The equation below is used to represent the optimal energy value for n frames:

$$S'_n = \sum_{t=1}^{n-1} \|f_t - f_{t+1}\| \quad [17]$$

Figure 7:
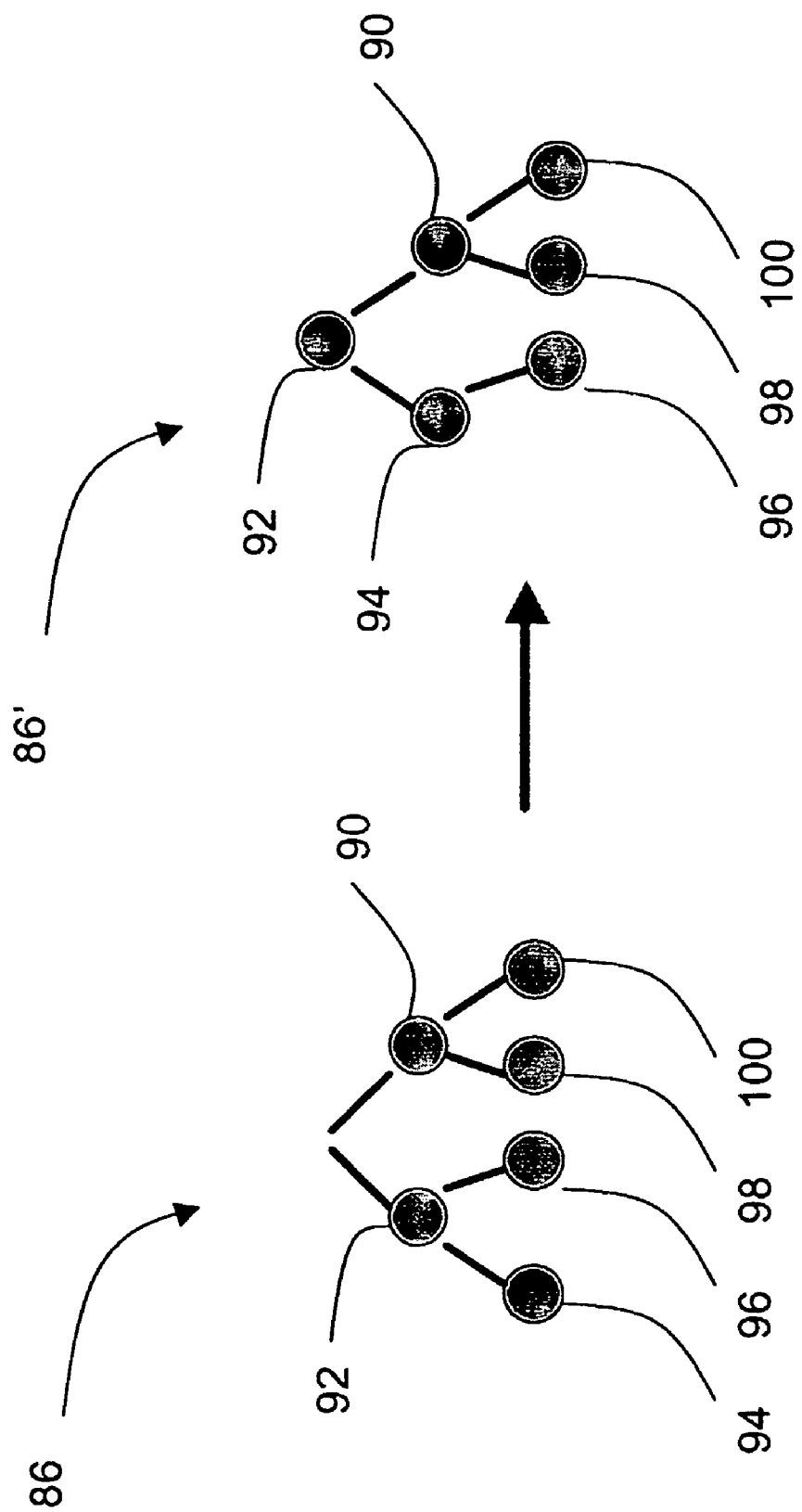
FIG. 7 illustrates a stage of reorganizing a representation of video frames in accordance with the present invention.

As illustrated in FIG. 7, the binary tree 86 is reorganized as tree 86' so that the root node 92 has the minimum key value and the binary structure is restored.

The optimal energy value for n−1 key frames is updated as follows:

$$S'_{n-1} = S'_n - \min_{1 \leq p \leq n} \{V_p\} \quad [18]$$

At the same time, the compensation values are updated for those frames which are affected by the discarding of frame $f_p$, e.g., frame 80. In the exemplary embodiment, the compensation value of the frames adjacent to the discarded frame $f_p$, e.g., frames 78 and 82. For example, suppose there are k greedy key frames $F_k' = \{f_{i_1}, f_{i_2}, \ldots, f_{i_k}\}$, and that the minimum of compensation value is $V_{i_p} = \min_{1 \leq t \leq k} \{V_{i_t}\}$. Then the sequence of k−1 greedy key frames is $F_{k-1}' = F_k' \setminus \{f_{i_p}\}$, and the energy value of the k−1 greedy key frames is $S_{k-1}' = S_k' - V_{i_p}$. Finally, we delete frame $f_{i_p}$ and update the compensation values of the key frames adjacent to $f_{i_p}$. The tree structure 86' is reorganized once again to tree structure 86" to maintain the binary heap structure. Alternative data structures may also be used to organize the frames, such as, for example, a binomial heap or a Fibonacci heap. The process described herein is repeated until the desired number of frames remain.

Figure 8:
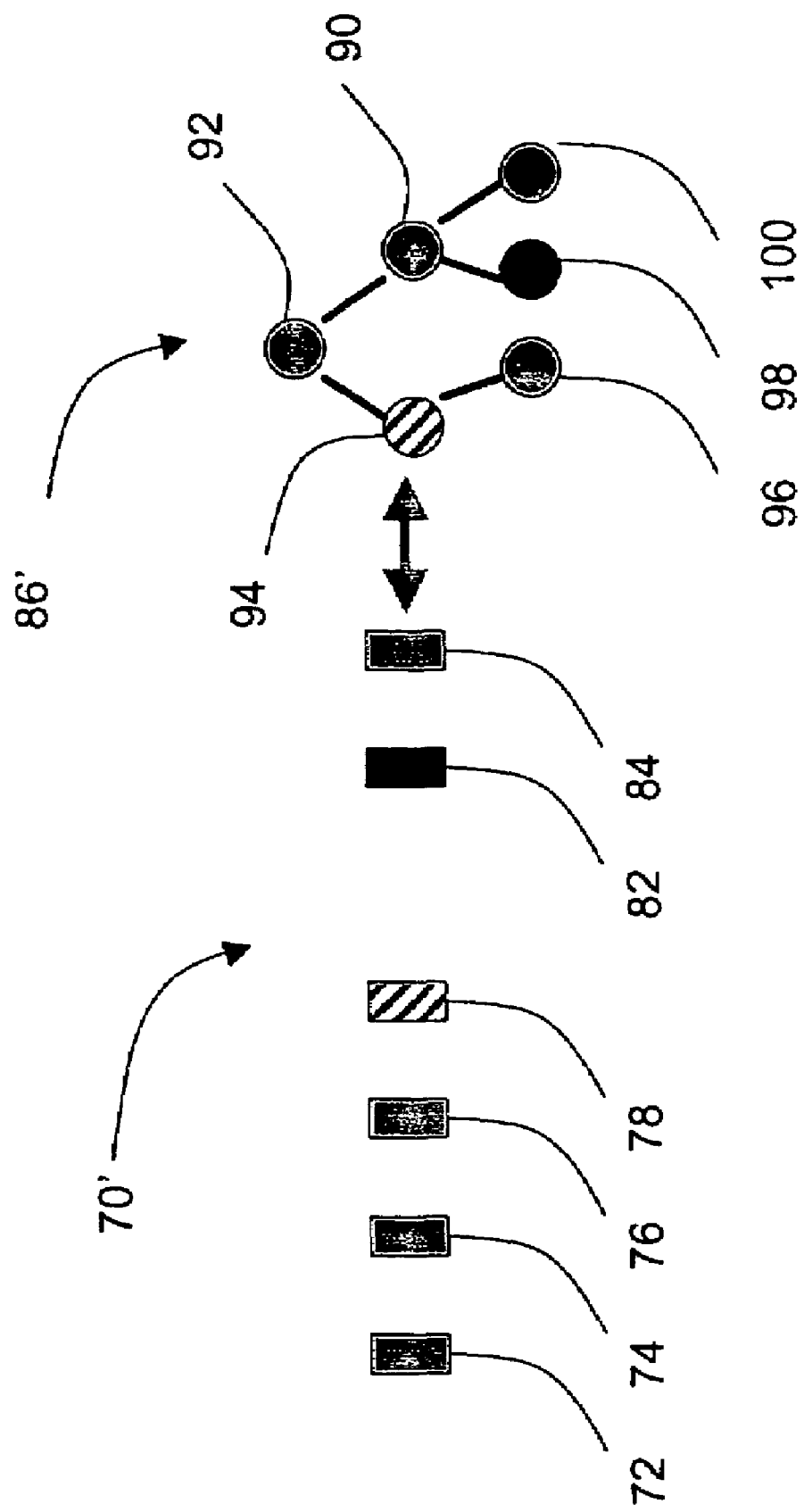
FIG. 8 illustrates a stage of calculating a criterion of several video frames in accordance with the present invention.
Figure 9:
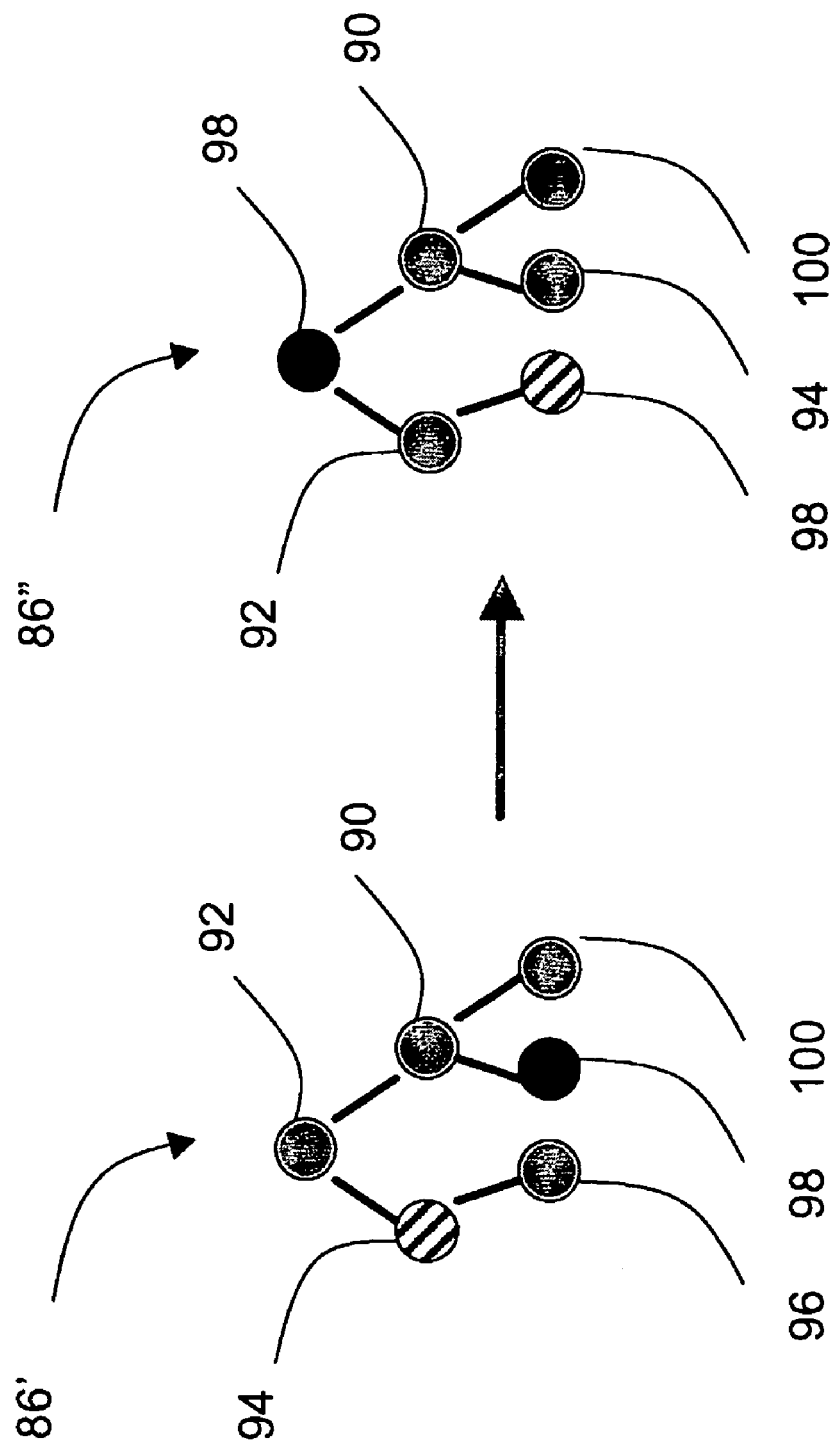
FIG. 9 illustrates a stage of reorganizing a representation of video frames in accordance with the present invention.

The computation complexity of this technique will now be explained. Memory usage is $O(n)$. As for time, the initialization step (FIG. 5) uses $O(n)$ distance computation operations to calculate all the compensation values, and in every step the compensation value is updated for a constant number of key frames (FIGS. 8-9). Thus, the total distance computation is $O(n)$. It may be shown that the arithmetic and comparison operations are $O(n \cdot \log(n))$ based on the performance of the heap, and for very long videos this would dominate. Since the frame distance computation is usually much more expensive than arithmetic and comparison operations, the frame distance computation, which is linear, is the critical factor for a video of reasonable size.

Another embodiment of the greedy algorithm is described, which has particular application in dense sampling uses, such as for streaming video. For each possible number of desired key frames, it produces a temporally sampled video sequence of frames, together with the time intervals that the key frames represent, which allows the original video sequence to be reconstructed with near-minimal error.

This application is based on an optimization criterion of video reconstruction error (VRE). This criterion, when used for video summarization, leads to a reconstructed video that is close to the original video sequence. When this criterion is used for video streaming, the hierarchy of video frames it efficiently produces can be used, on the server side, to dynamically adjust frame rates without losing reconstruction accuracy.

Figure 10:
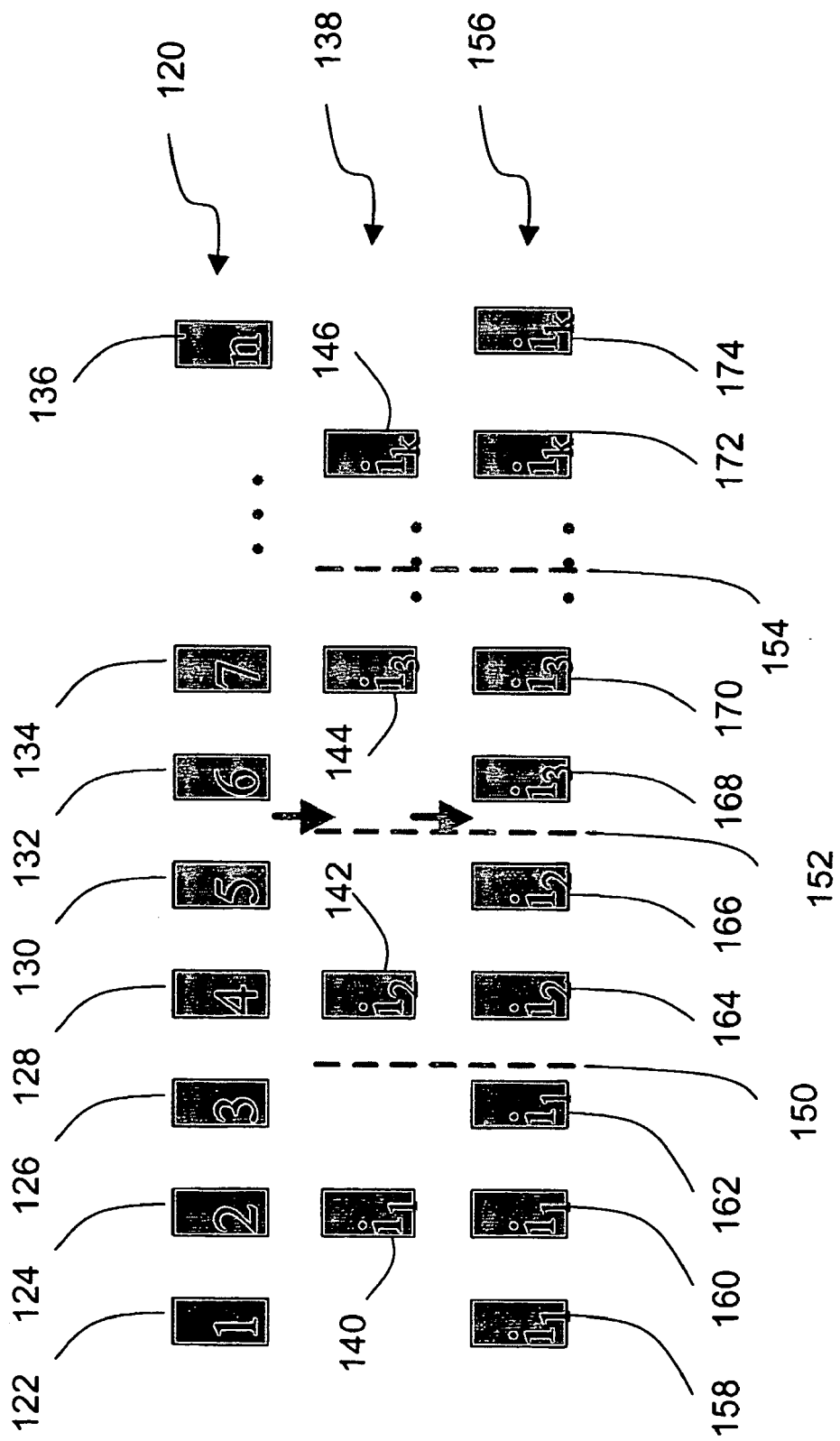
FIG. 10 illustrates a stage of reconstructing a video sequence in accordance with a further embodiment of the present invention.

As illustrated in FIG. 10, the original video sequence F 120 has n frames 122-136 represented by $f_t$, t=1, . . . , n. The original sequence F 120 is represented by a temporally ordered subsequence 138 of k key frames 140-146 as $F_k=\{f_{k_1}, f_{k_2}, \ldots, f_{k_k}\}$. Accordingly, $f_{k_p}$ is a key frame chosen from the frames numbered $t_{p-1}$ to $t_p-1$, and that these associated frame intervals of $F_k$ form a partition of the frames of the full video F, with $t_0=1$ and $t_k=n+1$. For example key frame $i_1$ 140 is a key frame chosen from the frames numbered $f_1$ 122 to $f_3$ 126. The frame intervals are indicated in FIG. 10 at locations 150, 152, and 154.

Using only the information of key frames and the temporal boundaries between them, the reconstructed video sequence as R 156 with frames $r_t$ 158-174, where $r_t = f_{k_p}$ for $t_{p-1} \leq t \leq t_p$. Intuitively, R plays the frames of $F_k$ in sequence at the "proper" times, e.g., frames 158, 160 and 162 would be played at the time corresponding to original frames 122-126.

The optimization criterion is the Video Reconstruction Error (VRE) of F given R in the well-known RMS error sense:

$$VRE(F, R) = \sqrt{\frac{1}{n}\sum_{t=1}^{n} \|f_t - r_t\|^2} \quad [19]$$

where $\|\cdot\|$ defines some distance measure between the frames. In this embodiment, the $L^1$ norm is used to determine the distance between the RGB histograms of the frames. In order to minimize VRE, it is sufficient to minimize the Square Error (SE):

$$SE(F, R) = \sum_{p=1}^{k}\sum_{t=t_{p-1}}^{t_p-1} \|f_t - f_{k_p}\|^2 \quad [20]$$

To minimize SE for a given k, the optimum value is determined by a greedy algorithm, as described above, which starts from the original n frames (at level n), and selects one frame to delete, leaving n−1 key frames (at level n−1). At any given level, having already selected k key frames at the prior step, the k−1 key frames are determined by deleting the one frame which most minimizes VRE. This approach derives all levels of key frames in one process, and also ranks the significance of all frames, where significance is defined as the level at which they were deleted; a frame with higher rank has survived longer and is more significant.

Figure 11:
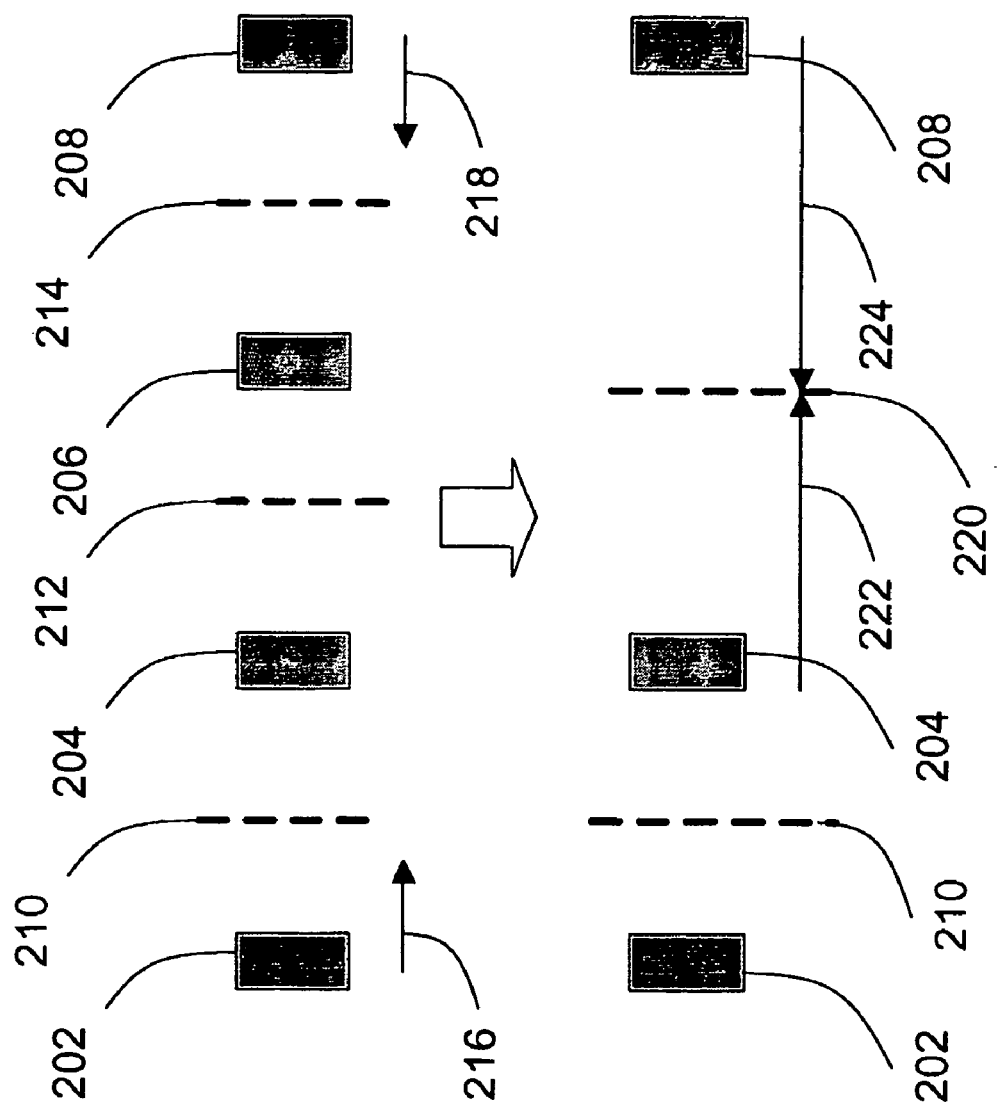
FIG. 11 illustrates a stage of determining state information for a frame in accordance with the present invention.

The binary heap data structure is also used in an embodiment of the invention, in which the nodes correspond to the video frames. Each node records the frame number, the current and forward state of the frame, and a "compensation value," or "impact value." The compensation value of a node represents the differential change of SE if the frame is deleted, and is used as the key of the heap. As illustrated in FIG. 11, the current state of a frame includes the left and right temporal boundaries ("left-boundary" and "right-boundary") of the interval represented by the key frame, e.g., left boundary 212 and right boundary 214 of frame 206 are represented in FIG. 11. The video reconstruction errors ("left-error" and "right-error") are measured from the frame to its left and right boundaries, e.g., right error of frame 202 is measured in direction indicated by arrow 216 and the left error of frame 208 is measured in the direction indicated by arrow 218. The forward state of a frame includes the new temporal boundary ("new-boundary") between its adjacent key frames if the key frame is deleted, e.g., the new-boundary 220 is between key frames 204 and 208 after key frame 206 was deleted. The forward left and right reconstruction errors ("forward-left-error" and "forward-right-error") of the frame are included if its adjacent left or right key frame is deleted instead, e.g., the right forward error of key frame 204 is computed in the direction indicated by arrow 222, and the left forward error of key frame 208 is computed in the direction indicated by arrow 224.

The algorithm has several steps. First, the values of the nodes are initialized and the binary heap is created. Next, the node with the minimum key (compensation value) is deleted. A subsequent step is to "forward compute" the new compensation value of the nodes that were affected by deleting the node, and to update the information of their forward state. The last two steps are repeated until a user-designated level of k key frames is achieved. This process is described in greater detail below.

The heap starts with the original n frames and SE=0. The values of current state and forward state of all nodes are initialized. The compensation value $V_p$ for node p is computed as:

$$V_p = \begin{cases} \|f_1 - f_2\|^2, & p = 1 \\ \|f_{p-1} - f_p\|^2, & p = n \\ \min\{\|f_{p-1} - f_p\|^2, \|f_p - f_{p+1}\|^2\}, & 1 < p < n \end{cases} \quad [21]$$

The binary heap is then constructed using compensation values as keys, as illustrated in FIG. 4, above.

For each level, the node with minimum compensation value in the heap is discarded to get the key frames of the next level, as illustrated in FIG. 5.

Assume there are k key frames $F_k=\{f_{k_1}, f_{k_2}, \ldots, f_{k_k}\}$. In FIG. 11, this is represented by four key frames 202-208. The node $f_{k_p}$ 206 with minimum compensation value $V_{k_p}$ is discarded, leaving k−1 key frames: $F_{k-1}=F_k\setminus\{f_{k_p}\}$, i.e., key frames 202, 204, and 208. The SE is updated: $SE \leftarrow SE + V_{k_p}$. Since discarded frame $f_{k_p}$ 206 was adjacent to frames $f_{k_{p-1}}$ 204 and $f_{k_{p+1}}$ 208, the current state of key frames $f_{k_{p-1}}$ 204 and $f_{k_{p+1}}$ 208 are updated from the pre-calculated values of the forward state of the nodes:

right-boundary of $f_{k_{p-1}} \leftarrow$ new-boundary of $f_{k_p}$ left-boundary of $f_{k_{p+1}} \leftarrow$ new-boundary of $f_{k_p}$ right-error of $f_{k_{p-1}} \leftarrow$ right-forward-error of $f_{k_{p-1}}$ left-error of $f_{k_{p+1}} \leftarrow$ left-forward-error of $f_{k_{p+1}}$ The technique of forward computing is next applied. After a node is deleted from the heap, the compensation values and forward states of the nodes that are affected by the deletion are computed, the compensation values are updated accordingly, and the positions of those nodes in the heap are adjusted (see, FIGS. 7-9).

When frame $f_{k_p}$ 206 is deleted from key frame level k, for the k−1 remaining key frames $f_{k_1}, \ldots, f_{k_{p-1}}, f_{k_{p+1}}, \ldots, f_{k_k}$, only the compensation values of nodes of $f_{k_{p-1}}$ 204 and $f_{k_{p+1}}$ 208 are affected. The forward values related to these two key frames are "forward-computed," in order to prepare for the next level. The procedure for forward computing the forward state for $f_{k_{p-1}}$ 204 is described herein; a similar approach can be applied to $f_{k_{p+1}}$ 208.

In general, the value of new-boundary of key frame $f_{k_{p-1}}$ 204 is the temporal boundary t* 220 between $f_{k_{p-2}}$ and $f_{k_{p+1}}$ such that t* minimizes the local squared error between these two key frames:

$$LSE(k_{p-2}, t^*, k_{p+1}) = \min_{k_{p-2} < t < k_{p+1}} \{LSE(k_{p-2}, t, k_{p+1})\} \quad [22]$$

where LSE($k_{p-2}$, t, $k_{p+1}$) is computed as $$\sum_{j=k_{p-2}+1}^{t-1} \|f_{k_{p-2}} - f_j\|^2 + \sum_{j=t}^{k_{p+1}-1} \|f_j - f_{k_{p+1}}\|^2 \quad [23]$$

After the new temporal boundary t* is computed, new-boundary of $f_{k_{p-1}}$ is updated as t*, and frame $f_{k_{p-1}}$'s new compensation value $V_{k_{p-1}}$ is updated as: LSE($i_{p-2}$, t*, $i_{p+1}$)−$V_{k_{p-1}}$-right-forward-error of $f_{k_{p-2}}$-left-forward-error of $f_{k_{p+1}}$.

The right-forward-error of $f_{k_{p-2}}$ and left-forward-error of $f_{k_{p+1}}$ are updated correspondingly:

$$\text{right-forward-error of } f_{k_{p-2}} \leftarrow \sum_{t=k_{p-2}+1}^{t^*-1} \|f_{k_{p-2}} - f_t\|^2$$

$$\text{left-forward-error of } f_{k_{p+1}} \leftarrow \sum_{t=t^*}^{k_{p+1}-1} \|f_t - f_{k_{p+1}}\|^2.$$

The temporal boundary t* can be found in linear time by using a cumulative summation. First the left-most value is computed, LSE($k_{p-2}$, $k_{p-2}$+1, $k_{p+1}$). All other values can be derived iteratively, proceeding to the right:

$$LSE(k_{p-2}, t+1, k_{p+1}) = LSE(k_{p-2}, t, k_{p+1}) + (\|f_{k_{p-2}} - f_t\|^2 - \|f_t - f_{k_{p+1}}\|^2) \quad [24]$$

This computation of all these LSE values takes 2($k_{p+1}$−$k_{p-2}$) units of frame distance computations. The cost of each computation may be further reduced by recording intermediate results and using the pre-stored values of the current states of the nodes in straightforward ways.

The memory usage of the algorithm is O(n) by using the data structure of heap is described. The time complexity is O(n•log(n)). Heap initialization takes O(n•log(n)) time. At each level k, searching for the frame with minimum compensation value and updating current boundaries takes constant time, or O(n) time over all levels. But because the average interval between two adjacent key frames at level k is n/k, at each level k, forward computing to find m takes an average of 2n/k frame distance computations, giving over all levels a time of $$\sum_{k=1}^{n} 2n/k = O(n \cdot \log(n)). \quad [25]$$

Figure 12:
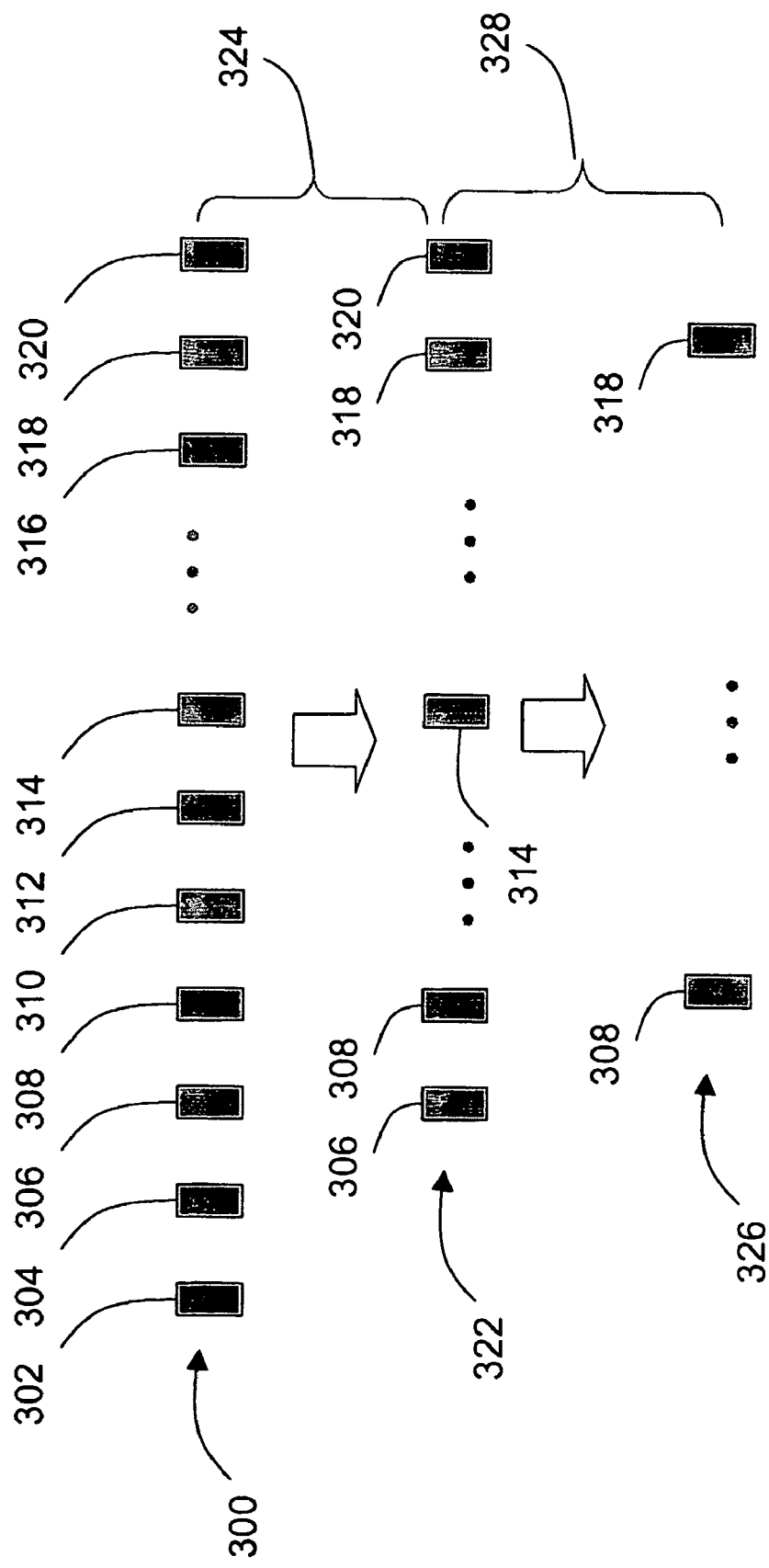
FIG. 12 illustrates a still further embodiment of the method for selecting subsequence of video frames in accordance with the present invention.

Another embodiment of the invention is described herein. The memory usage of O($n^2$) and the computation time of O($n^3$) of the first embodiment may be limited in the length of a video that can be processed by dynamic programming, given the processing power of currently available processors. The greedy algorithm used in the second embodiment, takes less memory and almost linear computation time, which makes it more suitable for extended videos. For improved performance for long videos, a hybrid model is used in accordance with the invention. As illustrated in FIG. 12, for a video sequence 300 of n frames 302-320, the greedy algorithm is used first to calculate key frames levels from n−1 to level k to produce sequence 322 (as indicated by bracket 324), then apply the dynamic programming algorithm on the selected k key frames to get key frames sequence 326 of length from 1 to k−1 (as indicated by bracket 328).

Figures 13, 14:
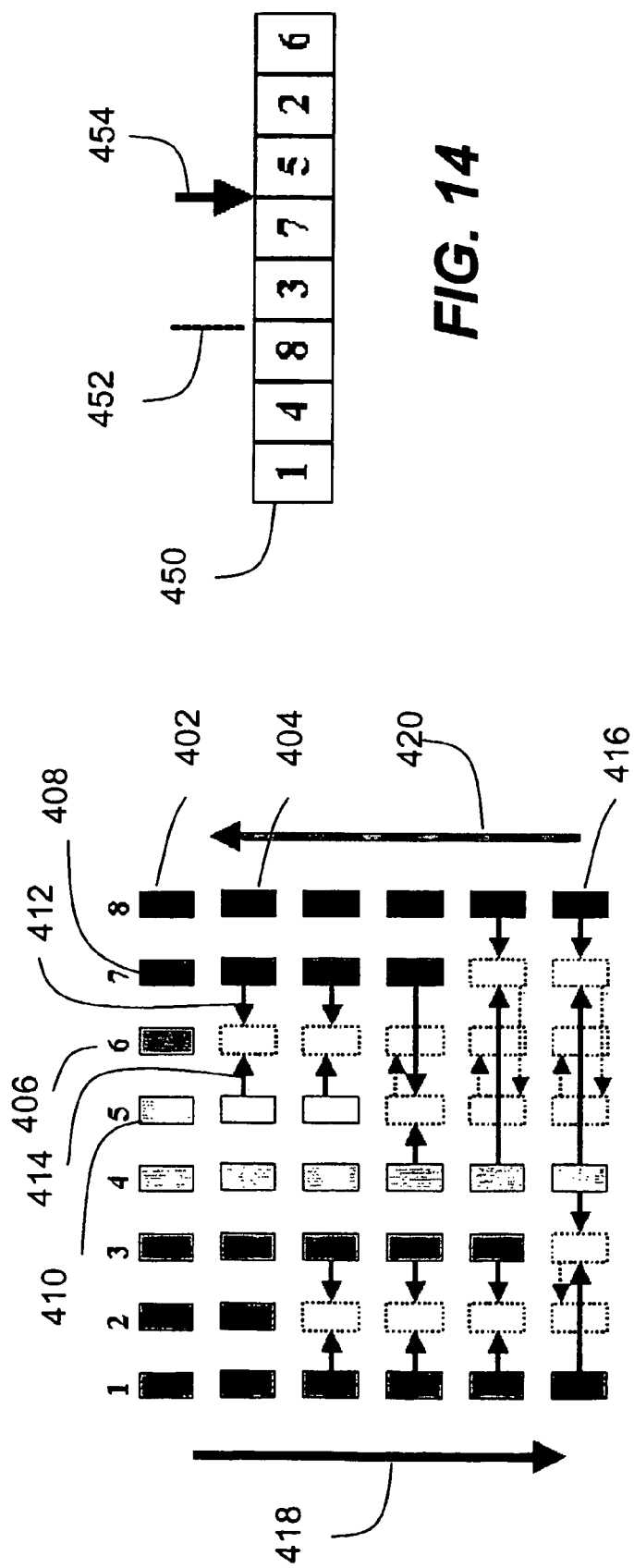
FIG. 13 illustrates a step of maintaining pointers to adjacent video frames in accordance with the present invention.
FIG. 14 represents an array for storing video frames in accordance with the present invention.

The key frame hierarchy created by the greedy algorithm has two important applications: video indexing and streaming. FIG. 13 depicts the process of discarding frames as described above by the greedy algorithm. In particular, from the first level 402 to the second level 404, the sixth frame $f_6$ 406 in the sequence of video frames is discarded. The frames $f_5$ 408 and $f_7$ 410, adjacent to the discarded frame $f_6$ 406, have pointers 412 and 414 respectively, which identify the frame $f_6$ 406, which was just discarded. The algorithm proceeds from level 402 through top level 416, in the direction indicated by arrow 418, with each remaining frame having pointers to the next adjacent frame that was just discarded. The top level 416, e.g., having three frames $f_1$, $f_4$, and $f_8$, is indicated in the frame significance array 450 by dashed line 452 (FIG. 14). Since all frames can be ranked by their significance, it is possible to select any desired length of a key frame sequence by simply choosing an appropriate cut-off point 454 in the frame significance array 450, the frames before this point, e.g., frames $f_1$, $f_4$, $f_8$, $f_3$, and $f_7$, are selected as key frames.

For interactive content retrieval and browsing of a video, different levels of the key frames can be displayed according to the frame significance array and the cut-off point. Moving the cut-off point in the direction of less significance displays more key frames, and vice versa. The frame significance array may also be used selectively to display more details of a video between any two designated key frames, which corresponds to moving in the direction indicated by arrow 420 in FIG. 13. For example, in a video of 8 frames as shown in FIG. 13, the top level has frames $f_1$, $f_4$, and $f_8$. To display a bit more content, the cut-off point is moved from "8-3" two steps to "7-5", and therefore display frames $f_3$ and $f_7$. Similarly, to expand content only between $f_5$ and $f_8$, we search the frame significance array starting from $f_8$ and display the first frame $f_i$ such that 5<i<7; here, that is frame $f_6$. This searching process can be simplified by storing two pointers with each frame number in the frame significance array, one pointing to the most recently discarded frame with frame index less than the current frame, and the second with frame index greater.

Figure 15:
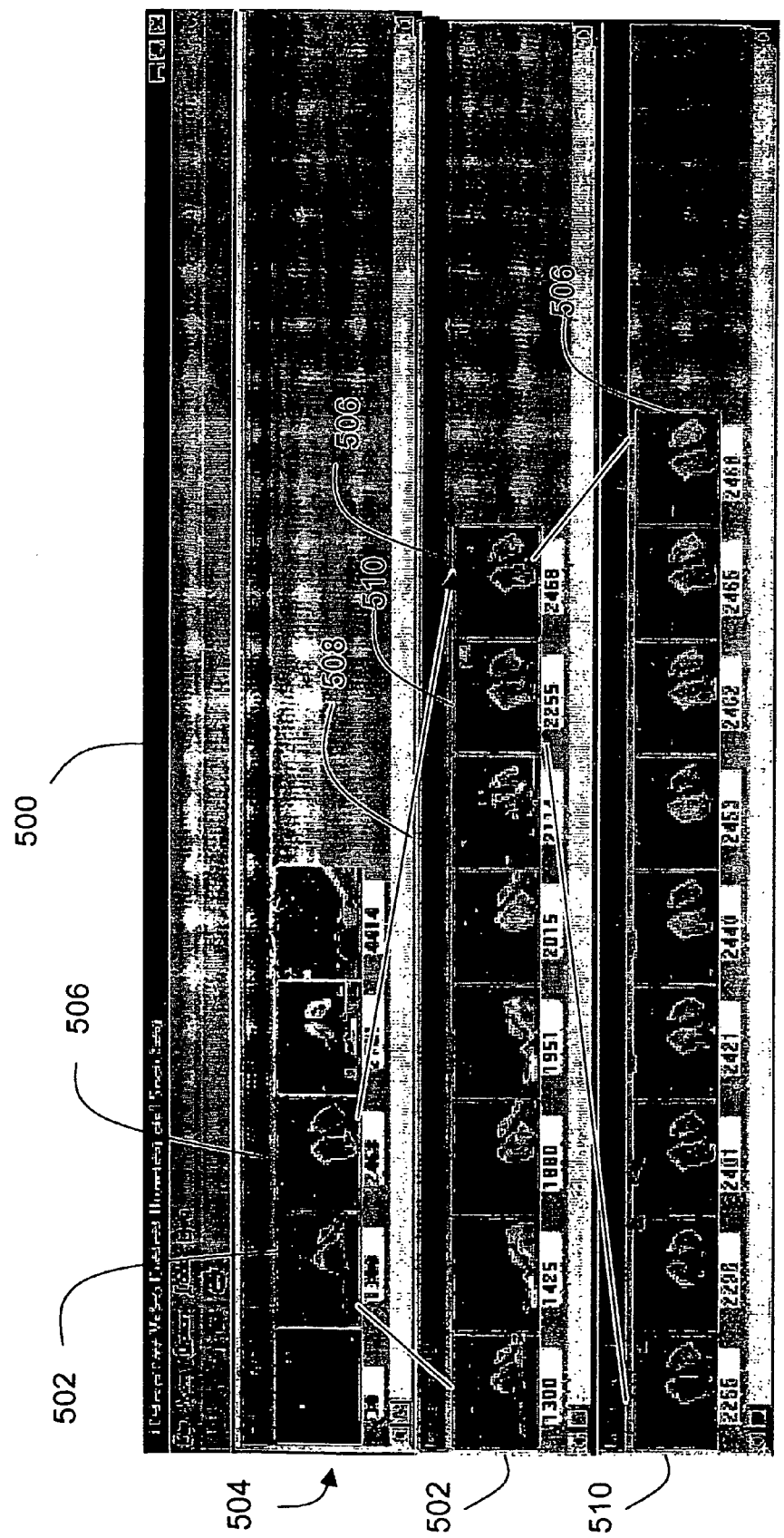
FIG. 15 represents a user interface in accordance with the present invention.

A software tool for interactive video browsing and searching was developed based on the above-described frame selection techniques. A sample user interface 500 is illustrated in FIG. 15. A user may browse different levels of key frames, or may view more key frames within a video segment, by a simple "click-drag" operation. The user selects a key frame 502 in level 504 as the start, clicks on a key frame 506 to signal the end frame of a desired video segment, then drags the end frame to the right (as indicated by arrow 508) while holding the mouse button down. A number of most significant key frames will show up to fill the available space between these two key frames 502 and 506. This process may be repeated, as between key frames 510 and 506, in order to view the key frames between those selected frames. To maximize the use of screen display, the key frames of selected video segment can be displayed in a new window below.

It will be understood that the foregoing is only illustrative of the principles of the invention, and that various modifications can be made by those skilled in the art without departing from the scope and spirit of the invention. For example, the greedy algorithm can be easily used for dynamic compressed video streaming, particularly in a networked environment with heterogeneous platforms. The required compression ratio can change dynamically with available network bandwidth. Accordingly, the cut-off point in the significance array can also be adjusted dynamically even during the video streaming.

What is claimed is:

1. A method for selecting a subsequence of video frames from a sequence of video frames, comprising the steps of:
   (a) defining a distance function between video frames in the sequence of video frames using a processing unit;
   (b) defining an optimization criterion to express a feature of a plurality of subsequences of video frames selected from said sequence of video frames using a processing unit;
   (c) for a predetermined number of iterations:
      (i) defining a first subsequence of video frames and a second subsequence of video frames selected from said sequence of video frames using a processing unit;
      (ii) for each video frame in said second subsequence of video frames, determining a respective optimal value of the optimization criterion as determined between said video frame and each prior video frame in said first subsequence and storing information relating to the video frames associated with said optimal value using a processing unit;
   (d) determining an overall optimal value among the optimal values of the optimization criterion determined in step (c) using a processing unit;
   (e) retrieving the video frames stored in step (c) and associated with the overall optimal values of the optimization criterion using a processing unit.

2. A method according to claim 1, wherein the step of defining the distance function comprises defining the histogram difference based on the $L^1$ norm.

3. A method according to claim 1, wherein the step of defining the optimization criterion comprises defining the sum of all distances of adjacent frames in a subsequence.

4. A method according to claim 3, wherein the optimal value of the optimization criterion is a maximum value of the optimization criterion.

5. A method according to claim 1, wherein the step of defining a first subsequence of video frames and a second subsequence of video frames comprises defining said first subsequence and second subsequence based on the number of frames in the video sequence and the predefined number of iterations.

6. A method according to claim 1, wherein the step of defining a first subsequence of video frames and a second subsequence of video frames comprises, defining said first subsequence of video frames as said second subsequence of video frames defined in a previous iteration of step (c).

7. A method according to claim 1, wherein the step of determining a respective optimal value of the optimization criterion as determined between said video frame and each prior video frame in said first subsequence comprises determining a maximum value of a sum of a difference between said video frame and a prior video frame in the first subsequence and an optimal value of the optimization criterion for a previous iteration of step (c).

8. A method according to claim 1, wherein the step of determining a respective optimal value of the optimization criterion as determined between said video frame and each prior video frame in said first subsequence comprising storing information relating a subsequence of video frames associated with said optimal value in which the last video frame in said subsequence is said video frame.

9. A method according to claim 1, wherein the predetermined number of iterations in step (c) is a selected number of key frames.

10. A method according to claim 1 wherein each video frame selected in steps (a)-(e) is associated with a display time in which display of each said video frame begins, further comprising the step of determining said display time such that an error function is minimized.

11. A method according to claim 10, wherein said error function is a distance function measured between said video frames.

12. A method for selecting a first subsequence of video frames selected from a sequence of video frames, comprising the steps of:
   (a) defining a distance function between video frames in the sequence of video frames using a processing unit;
   (b) defining an optimization criterion to express a feature of subsequences of video frames selected from said sequence of video frames using a processing unit;
   (c) determining values of the optimization criterion for each frame in the sequence of video frames and organizing said video frames according to said values of the optimization criterion using a processing unit;
   (d) discarding a frame associated with an optimal value of the optimization criterion and reorganizing the video frames remaining after said discarding using a processing unit;
   (e) determining values of the optimization criterion for video frames affected by the step of discarding and reorganizing the video frames using a processing unit;
   and (f) for a predetermined number of iterations, repeating steps (d) and (e).

13. A method according to claim 12, wherein the step of defining a distance function comprises defining the histogram difference based on the $L^1$ norm.

14. A method according to claim 13, wherein the step of defining the optimization criterion comprises defining the sum of all distances of adjacent frames in a subsequence.

15. A method according to claim 12, wherein the method comprises the step of creating a reconstructed sequence of video frames based on a subsequence of video frames using a processing unit, and wherein the optimization criterion corresponds to the difference between corresponding frames of the sequence of video frames and the reconstructed sequence of video frames.

16. A method according to claim 15, wherein the step of defining the optimization criterion function comprises defining the root mean square error of all distances of corresponding frames from said sequence of video frames and said sequence of reconstructed video frames.

17. A method according to claim 12, wherein the step of defining an optimization criterion for each frame in the sequence of video frames further comprises defining a compensation value which represents a differential change of the value of the optimization criterion if the frame is discarded.

18. A method according to claim 12, wherein the step of organizing said video frames according to said values of the optimization criterion comprises organizing said video frames in a binary tree structure.

19. A method according to claim 18, further comprising organizing said video frames such that nodes of the binary tree structure correspond to said video frames using a processing unit.

20. A method according to claim 19, wherein said binary tree structure is a binary heap.

21. A method according to claim 20, wherein a node corresponding to a video frame having the lowest value of the optimization criterion is located at the root node of the binary tree structure.

22. A method according to claim 21, wherein the step of discarding a frame associated with an optimal value of the optimization criterion comprises discarding the video frame having the lowest value of the optimization criterion.

23. A method according to claim 22, wherein the step of reorganizing the video frames remaining after said discarding comprises reorganizing said remaining video frames into a binary heap.

24. A method according to claim 23, wherein the step of determining values of the optimization criterion affected by the step of discarding comprises recalculating the optimization criterion for video frames adjacent to said discarded frame.

25. A method according to claim 24, wherein the step of determining values of the optimization criterion affected by the step of discarding further comprises reorganizing said video frames in a binary heap.

26. A method according to claim 12, wherein the step of discarding a frame associated with an optimal value of the optimization criterion further comprises storing information associated with said discarded frame.

27. A method according to claim 26, further comprising displaying said video frames remaining using a processing unit after said step of discarding.

28. A method according to claim 27, further comprising providing the option of displaying video frames discarded using a processing unit in said step of discarding which are temporally located between a pair of selected frames.

29. A method according to claim 12, wherein step (f) further comprises repeating steps (d) and (e) until a predetermined number of video frames are remaining to form a second subsequence of video frames, the method further comprising the steps of:
(g) defining a second optimization criterion to express a feature of a plurality of subsequences of video frames selected from said second subsequence of video frames using a processing unit;
(h) for a predetermined number of iterations:
(i) defining a third subsequence of video frames and a fourth subsequence of video frames selected from said second subsequence of video frames using a processing unit;
(ii) for each video frame in said fourth subsequence of video frames, determining a respective optimal value of the second optimization criterion as determined between said video frame and each prior video frame in said third subsequence and storing information relating to the video frames associated with said optimal value using a processing unit;
j) determining an overall optimal value among the optimal values of the second optimization criterion determined in step (h) using a processing unit;
(k) retrieving the video frames stored in step (k) and associated with the overall optimal values of the second optimization criterion using a processing unit.

30. A method according to claim 29, wherein the step of defining the distance function comprises defining the histogram difference based on the $L^1$ norm.

31. A method according to claim 29, wherein the step of defining the optimization criterion comprises defining the sum of all distances of adjacent frames in a subsequence.

* * * * *